US011341665B2

(12) United States Patent
Kutulakos et al.

(10) Patent No.: US 11,341,665 B2
(45) Date of Patent: May 24, 2022

(54) METHOD AND SYSTEM FOR OPTIMIZING DEPTH IMAGING

(71) Applicant: THE GOVERNING COUNCIL OF THE UNIVERSITY OF TORONTO, Toronto (CA)

(72) Inventors: Kiriakos Neoklis Kutulakos, Toronto (CA); Seyed Parsa Mirdehghan, Richmond Hill (CA); Wenzheng Chen, Toronto (CA)

(73) Assignee: THE GOVERNING COUNCIL OF THE UNIVERSITY OF TORONTO, Toronto (CA)

(*) Notice: Subject to any disclaimer, the term of this patent is extended or adjusted under 35 U.S.C. 154(b) by 0 days.

(21) Appl. No.: 17/050,881

(22) PCT Filed: May 3, 2019

(86) PCT No.: PCT/CA2019/050596
§ 371 (c)(1),
(2) Date: Oct. 27, 2020

(87) PCT Pub. No.: WO2019/210431
PCT Pub. Date: Nov. 7, 2019

(65) Prior Publication Data
US 2021/0241475 A1      Aug. 5, 2021

Related U.S. Application Data

(60) Provisional application No. 62/666,150, filed on May 3, 2018.

(51) Int. Cl.
*G06T 7/521*     (2017.01)
*G01B 11/22*     (2006.01)
(Continued)

(52) U.S. Cl.
CPC .............. *G06T 7/521* (2017.01); *G01B 11/22* (2013.01); *G01B 11/2513* (2013.01);
(Continued)

(58) Field of Classification Search
None
See application file for complete search history.

(56) References Cited

U.S. PATENT DOCUMENTS

2012/0281930 A1    11/2012  Darouich et al.
2013/0156297 A1*   6/2013  Shotton ................ G06K 9/6255
                                                              382/159
(Continued)

FOREIGN PATENT DOCUMENTS

WO      2017/064457 A1      4/2017
WO      WO-2017064457 A1 *  4/2017  ........... H04N 19/176

OTHER PUBLICATIONS

"A. Adam, C. Dann, O. Yair, S. Mazor, and S. Nowozin, "Bayesian Time-of-Flight for Realtime Shape, Illumination and Albedo," IEEE T-PAMI, vol. 39, No. 5, pp. 851-864, 2017."

(Continued)

*Primary Examiner* — Edemio Navas, Jr.
(74) *Attorney, Agent, or Firm* — Bhole IP Law; Anil Bhole; Marc Lampert

(57) ABSTRACT

There is provided a system and method for optimizing depth imaging. The method including: illuminating one or more scenes with illumination patterns; capturing one or more images of each of the scenes; reconstructing the scenes; estimating the reconstruction error and a gradient of the reconstruction error; iteratively performing until the reconstruction error reaches a predetermined error condition: determining a current set of control vectors and current set of reconstruction parameters; illuminating the one or more scenes with the illumination patterns governed by the cur- (Continued)

rent set of control vectors; capturing one or more images of each of the scenes while the scene is being illuminated with at least one of the illumination patterns; reconstructing the scenes from the one or more captured images using the current reconstruction parameters; and estimating an updated reconstruction error and gradient; and outputting at least one of control vectors and reconstruction parameters.

14 Claims, 29 Drawing Sheets

(51) Int. Cl.
*G01B 11/25* (2006.01)
*H04N 13/207* (2018.01)
*H04N 13/254* (2018.01)
*H04N 13/271* (2018.01)

(52) U.S. Cl.
CPC ......... *H04N 13/207* (2018.05); *H04N 13/254* (2018.05); *H04N 13/271* (2018.05); *G06T 2207/10028* (2013.01); *G06T 2207/20081* (2013.01); *G06T 2207/20084* (2013.01)

(56) References Cited

U.S. PATENT DOCUMENTS

| | | | | |
|---|---|---|---|---|
| 2014/0313292 | A1* | 10/2014 | Xiong | G06T 7/55 348/46 |
| 2016/0321811 | A1 | 11/2016 | Benhimane et al. | |
| 2017/0094253 | A1* | 3/2017 | Matthews | H04N 13/254 |

OTHER PUBLICATIONS

"Bhandari, A. Kadambi, R. Whyte, C. Barsi, M. Fei- gin, A. Dorrington, and R. Raskar, Resolving multi-path interference in time-of-flight imaging via modulation frequency diversity and sparse regularization," Optics Letters, vol. 39, No. 6, pp. 1705-1708, 2014.
"C. Mertz, S. J. Koppal, S. Sia, and S. G. Narasimhan, "A low-power structured light sensor for outdoor scene reconstruction and dominant material identification," in IEEE Procams, pp. 15-22, 2012."
"C. Peters, J. Klein, M. B. Hullin, and R. Klein, "Solving trigonometric moment problems for fast transient imaging," ACM Trans. Graphics, vol. 34, No. 6, p. 220, 2015."
"C. Ti, R. Yang, J. Davis, and Z. Pan, "Simultaneous Time-of-Flight Sensing and Photometric Stereo With a Single ToF Sensor," in Proc. IEEE CVPR, pp. 4334-4342, 2015."
"Chakrabarti, "Learning Sensor Multiplexing Design through Backpropagation," in Proc. NIPS, pp. 3081-3089, 2016."
"D. Moreno, F. Calakli, and G. Taubin, "Unsynchronized structured light," in Proc. ACM SIGGRAPH Asia, pp. 178-11, 2015."
"D. Moreno, K. Son, and G. Taubin, "Embedded phase shifting: Robust phase shifting with embedded signals," in Proc. IEEE CVPR, pp. 2301-2309, 2015."
"D. Scharstein and R. Szeliski, "High-accuracy stereo depth maps using structured light," in Proc. IEEE CVPR, pp. 195-202, 2003."
"E. Horn and N. Kiryati, "Toward optimal structured light patterns," in Proc. IEEE 3DIM, pp. 28-35, 1997."
"F. Heide, M. B. Hullin, J. Gregson, and W. Heidrich, "Low-budget Transient Imaging Using Photonic Mixer Devices," in ACM TOG (SIGGRAPH), 2013."
"F. Li, H. Sekkati, J. Deglint, C. Scharfenberger, M. Lamm, D. Clausi, J. Zelek, and A. Wong, "Simultaneous Projector-Camera Self-Calibration for Three-Dimensional Reconstruction and Projection Mapping," IEEE TCI, vol. 3, No. 1, pp. 74-83, 2017."
"G. Damberg, J. Gregson, and W. Heidrich, "High Brightness HDR Projection Using Dynamic Freeform Lensing," ACM TOG, vol. 35, No. 3, pp. 1-11, 2016."

"G. Satat, M. Tancik, and R. Raskar, "Lensless imaging with compressive ultrafast sensing" IEEE Trans. Comput. Imaging, vol. 3, No. 3, pp. 398-407, 2017."
"G. Wetzstein, "Computational imaging with multi-camera time-of-flight systems," ACM TOG (SIGGRAPH), vol. 35, No. 1, 2016."
"International Search Report for PCT/CA2019/050596, Canadian Intellectual Property Office, dated Aug. 15, 2019."
"J. Gu, T. Kobayashi, M. Gupta, and S. K. Nayar, "Multiplexed illumination for scene recovery in the presence of global illumination," in Proc. IEEE ICCV, pp. 691-698, 2011."
"J. M. Huntley and H. Saldner, "Temporal phase—unwrapping algorithm for automated interferogram analysis," Appl Optics, vol. 32, No. 17, pp. 3047-3052, 1993."
"J. Martin and J. L. Crowley, "Experimental Comparison of Correlation Techniques," in Int. Conf. on Intelligent Autonomous Systems, 1995."
"J. Salvi, J. Pages, and J. Batlle, "Pattern codification strategies in structured light systems," Pattern Recogn, vol. 37, No. 4, pp. 827-849, 2004."
"J. Salvi, S. Fernandez, T. Pribanic, and X. Llado, "A state of the art in structured light patterns for sur-face profilometry," Pattern Recogn, vol. 43, No. 8, pp. 2666-2680, 2010."
"J. Y. Bouguet and p. Perona, "3D photography on your desk," in Proc. IEEE ICCV, pp. 43-50, 1998."
"J. Zhang, R. Etienne-Cummings, S. Chin, T. Xiong, and T. Tran, "Compact all-CMOS spatiotemporal compressive sensing video camera with pixel-wise coded exposure," Opt Express, vol. 24, No. 8, pp. 9013-9024, 2016."
"Kadambi and R. Raskar, "Rethinking Machine Vision Time of Flight With GHz Heterodyning," IEEE Access, vol. 5, pp. 26211-26223, 2017."
"Kadambi, R. Whyte, A. Bhandari, L. Streeter, C. Barsi, A. Dorrington, and R. Raskar, "Coded time of flight cameras sparse deconvolution to address multipath interference and recover time profiles," in Proc. ACM SIGGRAPH Asia, 2013."
"L. Zhang and S. K. Nayar, "Projection defocus analysis for scene capture and image display," in Proc. ACM SIGGRAPH, pp. 907-915, 2006."
"L. Zhang, B. Curless, and S. M. Seitz, "Rapid shape acquisition using color structured light and multi-pass dynamic programming," in Proc. IEEE 3DPVT, pp. 24-36, 2002."
"Li, B. Z. Gao, J. Wu, X. Peng, X. Liu, Y. Yin, and Z. Cai, "Structured light field 3D imaging," Opt Express, vol. 24, No. 18, pp. 20324-20334, 2016."
"M. Donlic, T. Petkovic, and T. Pribanic, "On Tablet 3D Structured Light Reconstruction and Registration," in Proc. ICCV, pp. 2462-2471, 2017."
"M. Gupta and S. Nayar, "Micro Phase Shifting," in Proc. IEEE CVPR, pp. 813-820, 2012."
"M. Gupta, A. Agrawal, A. Veeraraghavan, and S. G. Narasimhan, "A Practical Approach to 3D Scanning in the Presence of Interreflections, Subsurface Scattering and Defocus," Int. J. Computer Vision, vol. 102, No. 1-3, pp. 33-55, 2013."
"M. Gupta, Q. Yin, and S. Nayar, "Structured Light in Sunlight," in Proc. IEEE ICCV, pp. 545-552, 2013."
"M. Gupta, Y. Tian, S. G. Narasimhan, and L. Zhang, "A Combined Theory of Defocused Illumination and Global Light Transport," Int. J. Computer Vision, vol. 98, No. 2, 2011."
"M. Holroyd, J. Lawrence, and T. Zickler, "A Coaxial Optical Scanner for Synchronous Acquisition of 3D Geometry and Surface Reflectance," in Proc. ACM SIGGRAPH Asia, 2010."
"M. O'Toole and K. N. Kutulakos, "Optical computing for fast light transport analysis," ACM TOG (SIGGRAPH Asia), vol. 29, No. 6, 2010."
"M. O'Toole, F. Heide, L. Xiao, M. B. Hullin, W. Heidrich, and K. N. Kutulakos, "Temporal frequency probing for 5D transient analysis of global light transport," ACM TOG (SIG-GRAPH), vol. 33, No. 4, 2014."
"M. O'Toole, S. Achar, S. G. Narasimhan, and K. N. Kutulakos, "Homogeneous codes for energy-efficient illumination and imaging," in Proc. ACM SIGGRAPH Asia, 2015."

(56) References Cited

OTHER PUBLICATIONS

"Moreno, J. A. Davis, T. M. Hernandez, D. M. Cottrell, and D. Sand, "Complete polarization control of light from a liquid crystal spatial light modulator," Opt Express, vol. 20, No. 1, pp. 364-376, 2012."

"N. Natarajan, I. S. Dhillon, P. K. Ravikumar, and A. Tewari, "Learning with Noisy Labels," in Proc. NIPS, pp. 1196-1204, 2013."

"Neelakantan, L. Vilnis, Q. V. Le, I. Sutskever, L. Kaiser, K. Kurach, and J. Martens, "Adding Gradient Noise Im-proves Learning for Very Deep Networks," in Proc. ICLR, 2017."

"R. Horstmeyer, R. Y. Chen, B. Kappes, and B. Judkewitz, "Convolutional neural networks that teach microscopes how to image," arXiv, 2017."

"R. Ishiyama, S. Sakamoto, J. Tajima, T. Okatani, and K. Deguchi, "Absolute phase measurements using geometric constraints between multiple cameras and projectors," Appl Optics, vol. 46, No. 17, pp. 3528-3538, 2007."

"S. Achar and S. G. Narasimhan, "Multi Focus Structured Light for Recovering Scene Shape and Global Illumination," in Proc. ECCV, pp. 205-219, 2014."

"S. Achar, J. R. Bartels, W. L. R. Whittaker, K. N. Kutulakos, and S. G. Narasimhan, "Epipolar time-of-flight imaging," ACM TOG (SIGGRAPH), vol. 36, No. 4, 2017."

"S. J. Koppal, S. Yamazaki, and S. G. Narasimhan, "Exploiting DLP Illumination Dithering for Reconstruction and Photography of High-Speed Scenes," Int. J. Computer Vision, vol. 96, No. 1, pp. 125-144, 2012."

"S. R. Fanello, C. Rhemann, V. Tankovich, A. Kowdle, S. O. Escolano, D. Kim, and S. Izadi, "HyperDepth: Learning Depth from Structured Light without Matching," in Proc. IEEE CVPR, pp. 5441-5450, 2016."

"S. R. Fanello, J. Valentin, C. Rhemann, A. Kowdle, V. Tankovich, P. Davidson, and S. Izadi, "UltraStereo: Efficient Learning-Based Matching for Active Stereo Systems," in Proc. IEEE CVPR, pp. 6535-6544, 2017."

"T. Pribanic, H. Dz'apo, and J. Salvi, "Efficient and Low-Cost 3D Structured Light System Based on a Modified Number-Theoretic Approach," EURASIP J. Adv. Signal Process., 2010."

"T. Chen, H.-P. Seidel, and H. P. A. Lensch, "Modulated phase-shifting for 3D scanning," in Proc. IEEE CVPR, 2008."

"T. Koninckx and L. Van Gool, "Real-time range acquisition by adaptive structured light," IEEE T-PAMI, vol. 28, No. 3, pp. 432-445, 2006."

"T. Pribanic, S. Mrvos', and J. Salvi, "Efficient multiple phase shift patterns for dense 3D acquisition in structured light scanning," Image and Vision Computing, vol. 28, No. 8, pp. 1255-1266, 2010."

"V. Couture, N. Martin, and S. Roy, "Unstructured Light Scanning Robust to Indirect Illumination and Depth Discontinuities," Int. J. Computer Vision, vol. 108, No. 3, pp. 204-221, 2014."

"Written Opinion for PCT/CA2019/050596, Canadian Intellectual Property Office, dated Aug. 15, 2019."

"Y. Xu and D. G. Aliaga, "Robust pixel classification for 3d modeling with structured light," in Proc. Graphics Interface, pp. 233-240, 2007."

"Y. Y. Schechner, S. K Nayar, and P. N. Belhumeur, "Multiplexing for optimal lighting," IEEE T-PAMI, vol. 29, No. 8, pp. 1339-1354, 2007."

* cited by examiner

| Light source | Camera sensor | Reconstruction function |
|---|---|---|
| †DMD projector [49] | †Grayscale | †max-ZNCC [11] |
| †Laser projector [50] | †RGB filter | †max-ZNCC3 (Section 4) |
| LCoS projector [51] | †Coded-exposure [46] | †max-ZNCC3-NN (Section 4) |
| Projector array [52] | Correlation ToF [12] | deep neural net [53] |
| MHz laser [9] | ToF sensor array [6] | |
| MHz laser + DMD [7] | Light field [54] | |
| MHz laser array [55] | | |

Error functions $\text{err}(\mathbf{e}) = \sum_i \rho(\mathbf{e}[i])$

| † $\epsilon$-precision [11] | † $L_2$ norm [13] | † $L_1$ norm [10] | M-estimator [56] |
|---|---|---|---|

FIG. 18

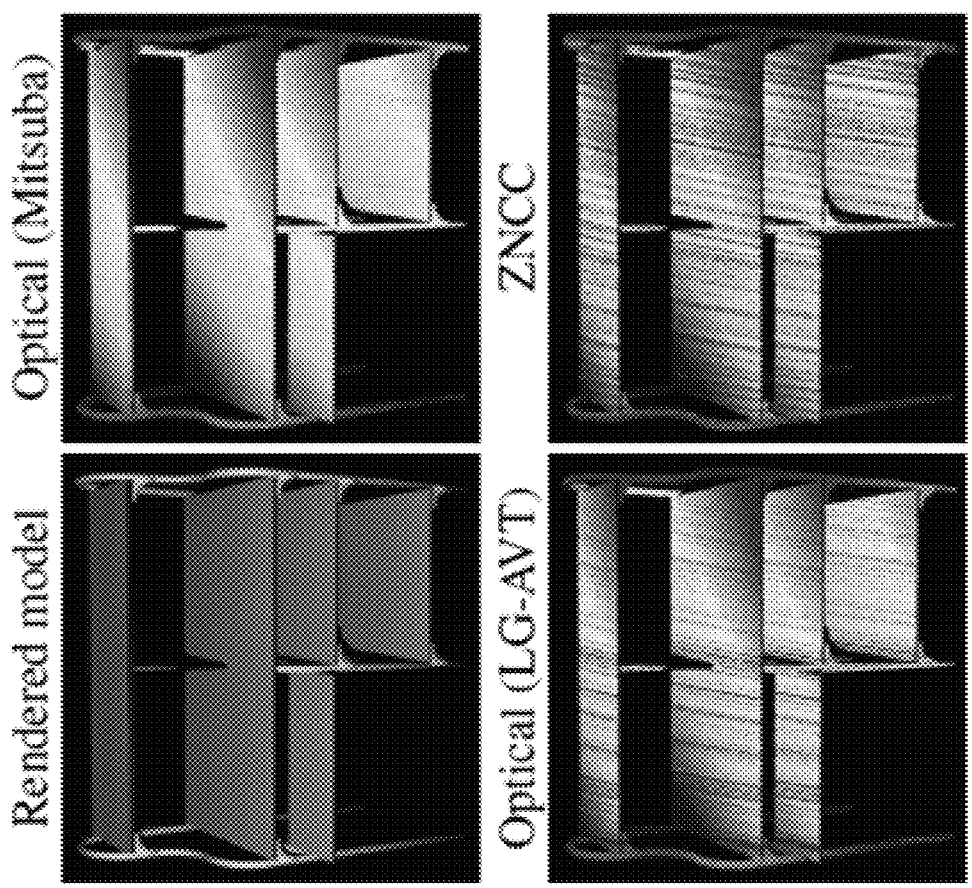
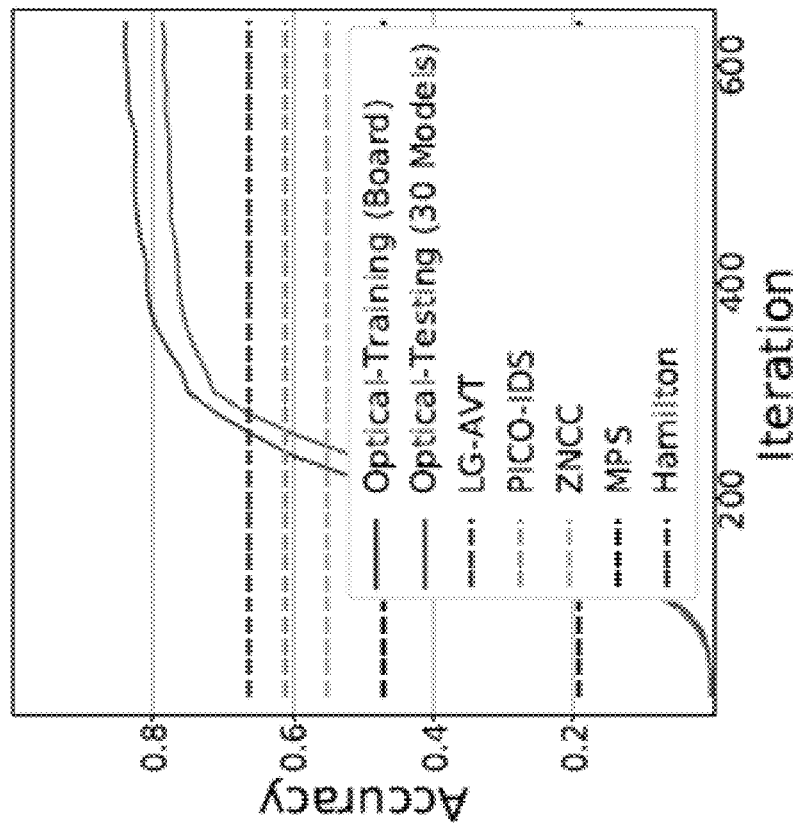
FIG. 25

METHOD AND SYSTEM FOR OPTIMIZING DEPTH IMAGING

TECHNICAL FIELD

The following relates generally to image processing, and more specifically, to a method and system for optimizing depth imaging.

BACKGROUND

From natural user interfaces to self-driving cars and 3D printers, there is an ever-Increasing need for sensors to capture the world in three-dimension (3D), and to do so in real time, accurately, and robustly. A particular type of camera, called an RGB-D camera, offers a source of input of 3D images. Generally, RGB-D cameras rely on some form of projected structured-light pattern or patterns to actively illuminate objects being imaged.

Fast and accurate structured-light imaging is getting increasingly popular. Already, the high pixel counts of modern smartphones and home-theater projectors theoretically allow 3D accuracies of 100 microns or less. Similar advances are occurring in the domain of time-of-flight (ToF) Imaging as well, with inexpensive continuous-wave ToF sensors, programmable lasers, and spatial modulators becoming increasingly available. Unfortunately, despite the wide availability of all these devices, achieving optimal performance in a given structured-light imaging system is still a substantial challenge.

SUMMARY

In an aspect, there is provided a computer-implemented method for optimizing depth imaging, the method comprising: illuminating one or more scenes with illumination patterns governed by an initial set of control vectors; capturing one or more images of each of the scenes while the scene is being illuminated with at least one of the illumination patterns; reconstructing the scenes from the captured images with reconstruction parameters; estimating the reconstruction error and a gradient of the reconstruction error with respect to the control vectors and the reconstruction parameters; iteratively performing until the reconstruction error reaches a predetermined error condition: determining a current set of control vectors and current set of reconstruction parameters by updating at least one of the set of control vectors and the set of reconstruction parameters to reduce the reconstruction error; illuminating the one or more scenes with the illumination patterns governed by the current set of control vectors; capturing one or more images of each of the scenes while the scene is being illuminated with at least one of the illumination patterns; reconstructing the scenes from the one or more captured images using the current reconstruction parameters; and estimating an updated reconstruction error and an updated gradient of the reconstruction error with respect to the current control vectors and the current reconstruction parameters; and outputting at least one of the current control vectors and the current reconstruction parameters.

In a particular case of the method, estimating the reconstruction error comprises evaluating a function that penalizes depth errors with respect to a ground truth, and wherein iteratively reducing the reconstruction error comprises performing at least one of stochastic gradient descent and derivative-free optimization.

In another case, the initial control vectors comprise at least one of pre-existing control vectors, random control vectors, or low-contrast random control vectors.

In yet another case, updating the set of control vectors also comprises incorporating user-defined constraints comprising at least one of frequency content of the illumination patterns, amplitude of the illumination patterns, and total energy consumption of the illumination patterns.

In yet another case, the one or more scenes are computationally generated and restricted to lie in a selected subset of 3D space, wherein illuminating the one or more scenes with the illumination pattern comprises a computational simulation, wherein capturing the one or more images comprises computationally simulating image formation, and wherein estimating the gradient of the reconstruction error comprises determining a derivative based on an image formation model.

In yet another case, the one or more scenes comprise at least one surface, illuminating the one or more scenes with the illumination patterns comprises optical illumination, capturing the one or more images comprises optically capturing the one or more images, and estimating the gradient of the reconstruction error comprises optically estimating an image Jacobian with respect to the control vectors.

In yet another case, the one or more scenes comprise a randomly-textured surface that exhibits at least one of direct surface reflection, sub-surface scattering, or surface inter-reflection.

In yet another case, the control vectors comprise at least one of a discretized time-varying illumination pattern and a discretized time-varying pixel demodulation function.

In another aspect, there is provided a system for optimizing depth imaging, the system comprising one or more processors in communication with a data storage, the one or more processors configurable to execute: an illumination module to direct illumination of one or more scenes with illumination patterns governed by an initial set of control vectors; a capture module to receive one or more captured images of each of the scenes while the scene is being illuminated with at least one of the illumination patterns; a reconstruction module to: reconstruct the scenes from the captured images with reconstruction parameters; estimate the reconstruction error and a gradient of the reconstruction error with respect to the control vectors and the reconstruction parameters; and iteratively perform until the reconstruction error reaches a predetermined error condition: determining a current set of control vectors and current set of reconstruction parameters by updating at least one of the set of control vectors and the set of reconstruction parameters to reduce the reconstruction error; Illuminating the one or more scenes with the illumination patterns governed by the current set of control vectors; capturing one or more images of each of the scenes while the scene is being illuminated with at least one of the illumination patterns; reconstructing the scenes from the one or more captured images using the current reconstruction parameters; and estimating an updated reconstruction error and an updated gradient of the reconstruction error with respect to the current control vectors and the current reconstruction parameters; and an output interface to output at least one of the current control vectors and the current reconstruction parameters.

In a particular case of the method, estimating the reconstruction error comprises evaluating a function that penalizes depth errors with respect to a ground truth, and wherein iteratively reducing the reconstruction error comprises performing at least one of stochastic gradient descent and derivative-free optimization.

In another case, the initial control vectors comprise at least one of pre-existing control vectors, random control vectors, or low-contrast random control vectors.

In yet another case, updating the set of control vectors also comprises incorporating user-defined constraints comprising at least one of frequency content of the illumination patterns, amplitude of the illumination patterns, and total energy consumption of the illumination patterns.

In yet another case, the one or more scenes are computationally generated and restricted to lie in a selected subset of 3D space, wherein illuminating the one or more scenes with the illumination pattern comprises a computational simulation, wherein capturing the one or more images comprises computationally simulating image formation, and wherein estimating the gradient of the reconstruction error comprises determining a derivative based on an image formation model.

In yet another case, the one or more scenes comprise at least one surface, illuminating the one or more scenes with the illumination patterns comprises optical illumination, capturing the one or more images comprises optically capturing the one or more images, and estimating the gradient of the reconstruction error comprises optically estimating an image Jacobian with respect to the control vectors.

In another aspect, there is provided a computer-implemented method for generating a depth image of a scene, the method comprising: illuminating the scene with one or more illumination patterns, each pattern comprising a plurality of discretized elements, intensity of each element governed by a code vector; capturing one or more images of the scene while the scene is being illuminated; for each pixel, generating an observation vector comprising at least one intensity recorded at the pixel for each of the captured images; for each pixel, determining the code vector that best corresponds with the respective observation vector by maximizing the zero-mean normalized cross-correlation (ZNCC); for each pixel, determining a depth value from the best-corresponding code vector; and outputting the depth values as a depth image.

In a particular case of the method, each observation vector incorporates intensities of neighbouring image pixels, and wherein each code vector incorporates neighbouring discretized intensities.

In another case, the method further comprising: using a trained artificial neural network to transform each observation vector to a higher-dimensional feature vector; and using a trained artificial neural network to transform each code vector to a higher-dimensional feature vector, wherein determining the code vector that best corresponds with the respective observation vector comprises maximizing the ZNCC between the transformed respective observation vector and the transformed code vectors.

In yet another case, each illumination pattern is a discretized two-dimensional pattern that is projected onto a scene from a viewpoint that is distinct from the captured images, wherein each element in the pattern is a projected pixel, and wherein determining the depth value from the best-corresponding code vector comprises triangulation.

In yet another case, each illumination pattern comprises multiple wavelength bands, wherein the observation vector at each pixel comprises the raw or demosaiced intensities of each wavelength band for the respective pixel.

In yet another case, the discretized elements of each illumination pattern comprise a discretized time-varying pattern that modulates the intensity of a light source, each element in the pattern is associated with a time-of-flight delay and a code vector, and wherein determining the depth value from the best-corresponding code vector comprises multiplication by the speed of light.

These and other aspects are contemplated and described herein. It will be appreciated that the foregoing summary sets out representative aspects of systems and methods for animated lip synchronization to assist skilled readers in understanding the following detailed description.

BRIEF DESCRIPTION OF THE DRAWINGS

A greater understanding of the embodiments will be had with reference to the Figures, in which:

FIG. 18 shows examples of devices and functions compatible with the system of FIG. 14;

FIG. 25 illustrates, for the example experiment, evolution of training accuracy and validation accuracy;

DETAILED DESCRIPTION

Figure 1:
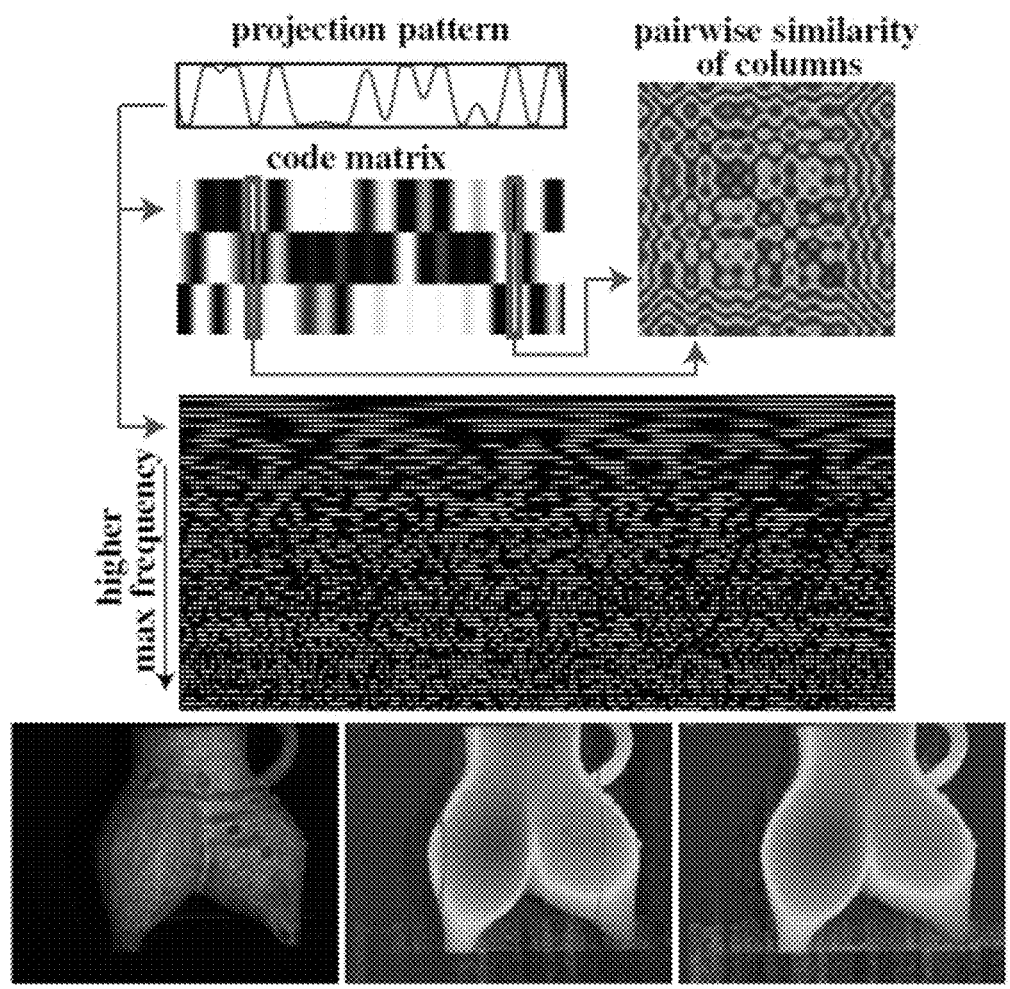
FIG. 1 show example illustrations of projection patterns, optimal matrices, and depth maps of an object.

Embodiments will now be described with reference to the figures. For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Any module, unit, component, server, computer, terminal, engine or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

The following relates generally to image processing, and more specifically, to a method and system for optimizing depth imaging.

Generally, structured light applies a predefined illumination pattern which can be used in conjunction with three-dimension (3D) reconstruction algorithms to arrive at a 3D reconstruction of an imaged item or scene. The present inventors have advantageously determined illumination patterns, having greater performance than other approaches, using machine learning-based optimization.

Generally, the present inventors have determined that performance of a given pattern can depend on the precise imaging system hardware (i.e., the choice of projector and the choice of camera). The present embodiments, advantageously, make it possible to automatically learn-patterns that are fine-tuned to the specific hardware, yielding up to orders of magnitude higher accuracy in some cases compared to other approaches. In addition to generating the patterns, the present embodiments also provide for "decoding" of such patterns; for example, transforming captured images into precise 3D geometry.

Accordingly, the present embodiments provide a machine learning based optimization approach for automatically generating structured-light patterns that are optimized to produce high 3D measurement accuracy. The present embodiments also provide a "decoding" algorithm to convert intensities observed at a specific pixel across two or more images into a 3D distance measurement (for example, "depth"). The present embodiments also provide a machine learning based optimization approach that can automatically generate structured-light patterns that are customized for a particular hardware system, or even higher 3D accuracy. The present embodiments also provide a machine learning based optimization approach that jointly determines (a) best possible patterns and (b) best possible "decoding" algorithms to turn pixel intensities into 3D measurements.

As an example, the present embodiments can address the problem of automatically generating sequences of structured-light patterns for active stereo triangulation of a static scene. Unlike other approaches that use predetermined patterns and reconstruction algorithms tied to them, embodiments described herein, as an example, can generate patterns on-the-fly in response to certain specifications: number of patterns, projector-camera arrangement, workspace constraints, spatial frequency content, and the like. Pattern sequences can be specifically optimized to minimize an expected rate of correspondence errors under specifications for an unknown scene, and can be coupled to a sequence-independent algorithm for per-pixel disparity estimation. To achieve this, embodiments described herein can be used to derive an objective function that is relatively easy to optimize within a maximum-likelihood framework. By minimizing the optimization parameters, automatic discovery of pattern sequences can be generated. For example, the present inventors generated such sequences in under three minutes on a laptop, which were determined to outperform other triangulation techniques.

For structured-light triangulation, the choice of projection patterns generally has a great effect on usefulness. Over the years, the field has seen significant boosts in performance, in robustness, 3D accuracy, speed and versatility, due to new types of projection patterns, and new vision algorithms tailored to them. Underlying such advancements is the question of what are the optimal patterns to use and what algorithm should process the images they create? This question was posed more than twenty years ago but the answer was generally deemed intractable. Generally, pattern design has largely been driven by practical considerations and by intuitive concepts borrowed from many fields (for example, communications, coding theory, number theory, numerical analysis, and the like).

The present embodiments provide an approach to determination of optimal patterns for structured light. In an application of the embodiments, an approach is shown for projecting a sequence of patterns one by one onto a static scene and using a camera to estimate per-pixel depth by triangulation. Starting from first principles, an objective function is derived over the space of pattern sequences that quantifies the expected number of incorrect stereo correspondences, and then it is minimized.

In an example, an optimization using the present embodiments takes as input a projector's resolution and the desired number of projection patterns. In addition to these parameters, the present embodiments can generate patterns that are precisely optimized for 3D accuracy using a particular system (see, for example, FIG. 1). For example, for a particular system, taking into consideration a specific arrangement of projector and camera; a shape and dimensions of the 3D scanning volume; noise properties and peak signal-to-noise ratio of the overall imaging system; defocus properties of a projector lens; a desired upper bound on the patterns' spatial frequency; and any unknown scene geometry. Thus, in contrast to other approaches, the present embodiments do not provide a closed-form expression or "codebook" for a one-size-fits-all pattern sequence; rather, there is provided a way to generate scene-independent pattern sequences on the fly at near-interactive rates so that the patterns and the associated reconstruction algorithm can be easily and automatically adapted for best performance. This paradigm is referred to as structured light à la carte.

In embodiments of the present disclosure, a maximum-likelihood decoding approach can be used for determining stereo correspondences independently of projection pattern. This approach is not only computationally competitive with pattern-specific decoders, but also makes the pattern optimization problem itself tractable. In this way, by giving a way to quantify the expected errors a pattern sequence will cause, the present embodiments lead to an objective function over sequences that can be optimized numerically.

Advantageously, the present embodiments can turn structured-light imaging from a problem of algorithm design (for example, for creating patterns, unwrapping phases, computing correspondences, handling projector defocus) into one of problem specification (how many patterns, what working volume, what imaging system, etc.). Also advantageously, the present embodiments can demonstrate discovery of pattern sequences that can outperform other encoding schemes on hard cases: low numbers of patterns, geometrically-complex scenes, low signal-to-noise ratios, and the like. Also advantageously, the present embodiments provide for the emergence of imaging systems that can confer robustness to indirect light without restrictions on frequency content, giving newfound degrees of freedom for pattern optimization; this larger design space can be explored automatically with the present approach. Also advantageously, the present embodiments can provide a formulation that gives rise to new families of pattern sequences with unique properties, including (1) sequences designed to recover approximate, rather than exact, correspondences, and (2) sequences designed with information about free space and stereo geometry already built in. This encodes geometric scene constraints directly into the optical domain for added reliability, via the patterns themselves, rather than enforcing them by post-processing less reliable 3D data.

Generally, structured-light triangulation requires addressing two basic questions: (1) what patterns to project onto a scene and (2) how to determine projector-camera stereo correspondences from the images captured of the scene. Generally, a "good" set of projection patterns can be thought of as solving a one-dimensional position encoding problem for pixels on an epipolar line. Conversely, determining the stereo correspondence of a camera pixel can be generally thought of as a position decoding problem.

Figure 2:
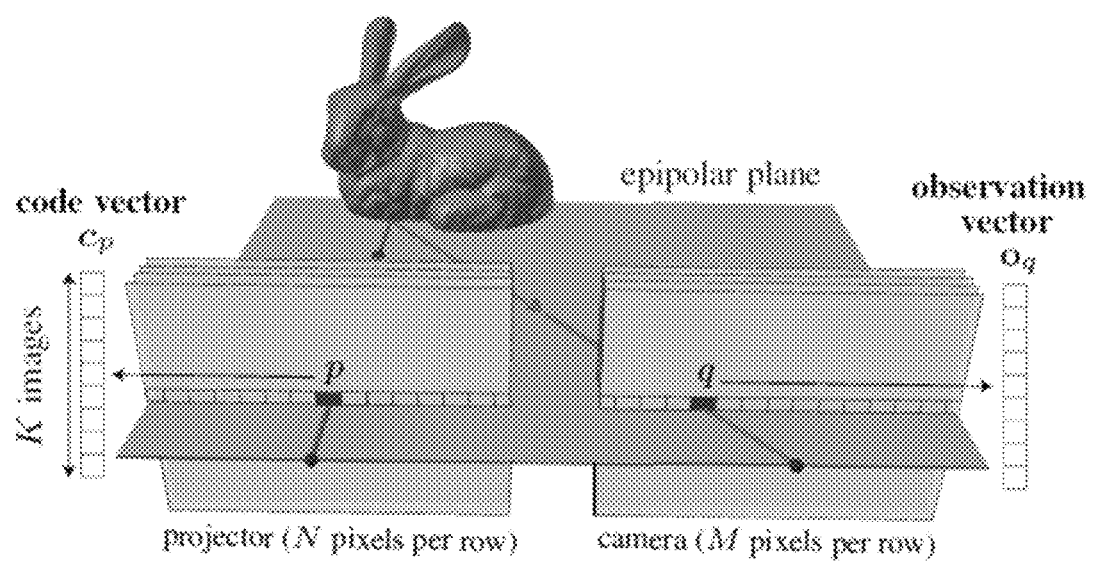
FIG. 2 is an illustration of viewing geometry in which a projector-camera system is assumed to have been rectified.

For determining a code matrix, a set of K projection patterns can be implicitly assigned a K-dimensional code vector $c_p$ to each pixel p on the epipolar line (see the example of FIG. 2). The elements of $c_p$ are the pixel's intensity in the individual patterns, they can be non-binary, and should be chosen so that each code vector is as distinctive as possible. This becomes harder to do as K decreases (i.e., vectors with fewer dimensions are less distinctive) and as the number of pixels increases (i.e., there are more vectors to be distinguished). The code vectors of an epipolar line are represented with a code matrix C. This matrix has size K×N for an epipolar line with N pixels.

For position decoding, a camera pixel q is considered. The K intensities observed at that pixel define a K-dimensional observation vector $o_q$. Given this vector and the code matrix C, the goal of position decoding is to infer its corresponding projector pixel p*. This can be a difficult problem because observations are corrupted by measurement noise and because the relation between observation vectors and code vectors can be highly non-trivial for general scenes. The projector pixel p* can be formulated as a maximum-likelihood (ML) problem:

$$p^* = \text{Decode}(o_q, C) \quad (1)$$

$$\text{Decode}(o_q, C) \stackrel{def}{=} \underset{1 \leq p \leq N}{\text{argmax}} Pr(o_q \mid c_p), \quad (2)$$

where $Pr(o_q|c_p)$ is the likelihood that the code vector of pixel q's true stereo correspondence is column p of C. While this formulation may be vaguely close, in spirit, to Bayesian time-of-flight depth estimation, the image formation model and decoding procedure are very different. Note that the inferred correspondence p* may or may not agree with the true correspondence p (see the example of FIG. 2).

For position encoding, the code matrix C can be chosen to minimize decoding error. For a given projector-camera system and a specific scene, this error is quantified by counting the incorrect correspondences produced by a decoder (such as a machine learning decoder of the present embodiments):

$$\text{Error }(C, \varepsilon) \overset{def}{=} \sum_{q=1}^{M} 1(|\text{Decode }(o_q, C) - \text{Match }(q)| > \varepsilon) \quad (3)$$

where Match(q) Is the true stereo correspondence of image pixel q; $\varepsilon$ is a tolerance threshold that permits small correspondence errors; 1( ) is the indicator function; and the summation is over all pixels on the epipolar line. Note that evaluating the error function in Equation (3) for a given scene and imaging system requires optimization, i.e., solving the decoding problem in Equation (2).

An optimal position encoding can be formulated as the problem of finding a code matrix $C_\varepsilon^*$ that minimizes the expected number of incorrect correspondences:

$$C_\varepsilon^* = \underset{C}{\text{argmin}}\, \mathbb{E}\,[\text{Error}(C, \varepsilon)] \quad (4)$$

where $\mathbb{E}[\ ]$ denotes expectation over a user-specified domain of plausible scenes and imaging conditions. $C_\varepsilon^*$ is referred to as the optimal code matrix for tolerance $\varepsilon$.

The present embodiments can be used to solve to the nested optimization problem in Equation (4) that is efficient to compute and can exploit imaging-system-specific information and user constraints. In an embodiment, the problem is cast as an optimization in the space of plausible epipolar transport matrices. The present embodiments can thus use a correlation-based machine learning (ML) decoder for structured-light reconstruction that is nearly optimal in low-noise settings. Using this decoder, the present embodiments provide a softmax-based approximation to the objective function of Equation (4) and minimize it to get patterns that minimize the expected number of stereo mismatches.

To simplify formal analysis, it can be assumed that all light transport is epipolar. Specifically, it is assumed that observation vectors depend only on code vectors on the corresponding epipolar line. This condition applies to conventionally-acquired images when global light transport, projector defocus and camera defocus are negligible. It also applies to all images captured by an epipolar-only imaging system regardless of scene content; even in the presence of severe global light transport.

Figure 11:
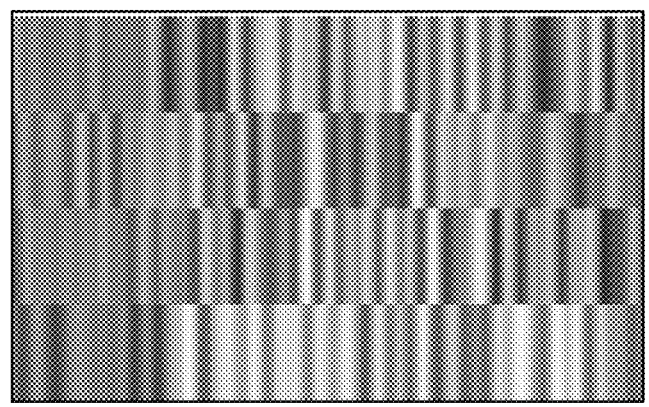
FIG. 11 illustrates an exemplary observation matrix according to embodiments described herein.

When epipolar-only imaging holds and the system has been calibrated radiometrically, the relation between code vectors and observation vectors is given by (see the example of FIG. 3):

$$\underbrace{[\,O_1\ \ldots\ O_M\,]}_{\text{observation matrix }O} = \underbrace{[\,c_1\ \ldots\ c_N\,]}_{\text{codematrix }C} T + 1 \underbrace{[\,a_1\ \ldots\ a_M\,]}_{\text{ambientvector }a} + e \quad (5)$$

where $O_1, \ldots, O_M$ are the observation vectors of all pixels on an epipolar line; $a_1, \ldots, a_M$ are contributions of ambient illumination to these pixels; 1 is a column vector of all ones; matrix e is the observation noise; and T is the N×M epipolar transport matrix. Element T[p,q] of this matrix describes the total flux transported from projector pixel p to camera pixel q by direct surface reflection, global transport, and projector or camera defocus. An example of observation matrix O is shown in FIG. 11.

The epipolar-only model of Equation (5) encodes the geometry and reflectance of the scene as well as the scene's imaging conditions. It follows that the expectation in the position-encoding objective function of Equation (4) is expressed most appropriately as an expectation over plausible epipolar transport matrices T, ambient vectors a, and noise matrices e.

For the space of plausible matrices T, even though the space of N×M matrices is extremely large, the matrices relevant to structured-light imaging belong to a much smaller space. This is because the elements of T associated with indirect light generally have far smaller magnitude than direct elements, and can thus be ignored. This in turn makes likelihoods and expectations very efficient to compute. In particular, the embodiments consider ML-decoding and optimal encoding for the following three families:

(A) Direct-only T, unconstrained: The non-zero elements of T represent direct surface reflections and each camera pixel receives light from at most one projector pixel. It follows that each column of T contains at most one non-zero element. Moreover, the location of that element can be considered a true stereo correspondence. The observation vector is therefore a noisy scaled-and-shifted code vector.

$$o_q = T[p,q] \cdot c_p + a_q + e_q \quad (6)$$

where vector $e_q$ denotes noise. It is assumed that the location of the non-zero element in each column of T is drawn randomly from the set $\{1, \ldots, N\}$ and its value, T[p,q], is a uniform i.i.d random variable over [0,1]. This amounts to being completely agnostic about the location and magnitude of T's non-zero elements.

Figures 4A, 4B, 4C:
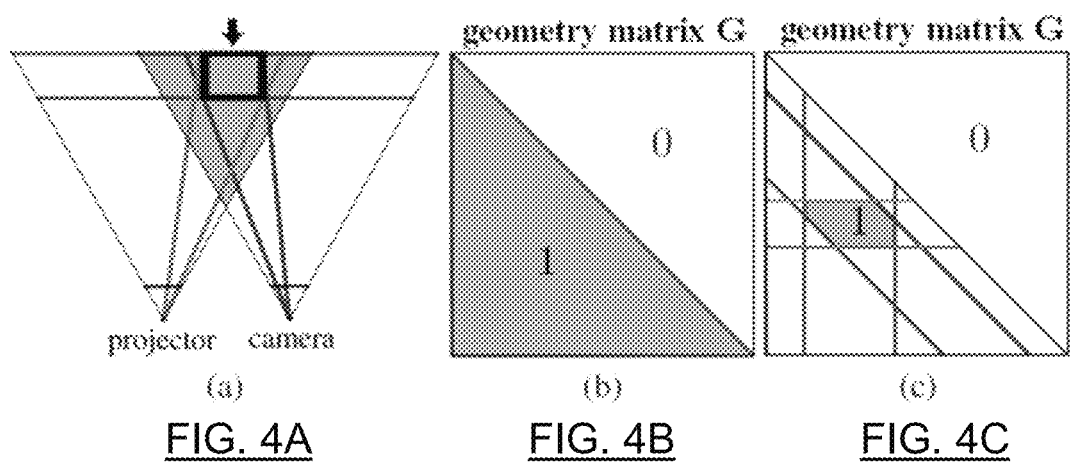
FIG. 4A is a geometric illustration of a top view of the epipolar plane.
FIG. 4B is a geometric illustration of T being lower triangular because the 3D rays of all other elements intersect behind the camera.
FIG. 4C is a geometric illustration restrictions of non-zero elements.

(B) Direct-only T with geometry constraints: The above family is restricted to exclude geometrically-implausible stereo correspondences. These are elements of T whose associated 3D rays either intersect behind the image plane or outside a user-specified working volume (see the example of FIG. 4A). These invalid elements are specified with a binary indicator matrix G (see the examples of FIGS. 4B and 4C). Given this matrix, it can be assumed that the location of the non-zero element in each column of T is drawn uniformly from the column's valid elements. FIG. 4B illustrates a geometric illustration of T being lower triangular because the 3D rays of all other elements intersect behind the camera. FIG. 4C illustrates a geometric illustration of how T's non-zero elements are restricted even further by knowledge of the working volume (e.g., black square in (a)): its depth range (red) and its angular extent from the projector (green) and the camera (blue) define regions in T whose intersection contains all valid correspondences.

(C) Direct-only T with projector defocus: The above two families do not model projector defocus. In some cases, this not only can prevent correct modeling of the defocused projection patterns that may illuminate some points, but also may ignore the rich shape information available in the defocus cue. Since a camera pixel may receive light from multiple projector pixels, the observation vector can be a noisy scaled-and-shifted mixture of code vectors:

$$o_q = T[p,q] \cdot (\Sigma_{i=1}^{N} b_i^{pq} c_i) + a_q + e_q \quad (7)$$

where T is a direct-only transport matrix from families (A) or (B). The coefficients $b_i^{pq}$ in Equation (7) account for the defocus kernel. This kernel is depth dependent and thus each matrix element T[p,q] is associated with a different set of coefficients. The coefficients themselves can be computed by calibrating the projector. Equation (7) can be made to conform to the epipolar image formation model of Equation (5) by setting the scene's transport matrix to be a new matrix T' whose i-th row is T'[i,q]=T[p, q]$b_i^{pq}$.

For the observation noise and ambient vector, the optimality of the ML position decoder generally relies on noise being signal independent and normally distributed. The position encoder, on the other hand, can accommodate any model of sensor noise as long as its parameters are known. In some cases, it can be assumed that the elements of the ambient vector a follow a uniform distribution over [0, $a_{max}$], where $a_{max}$ is the maximum contribution of ambient light expressed as a fraction of the maximum pixel intensity.

In an example, suppose a code matrix C and an observation vector $o_q$, which conforms to the epipolar-only image formation model, are given. A task is to identify the stereo correspondence of pixel q by seeking a generic solution to this problem that does not impose constraints on the contents of the code matrix: it can contain code vectors defined a priori, such as MPS or XOR codes, or be a general matrix computed automatically through optimization.

To solve the above, the present embodiments can determine a zero-mean normalized cross-correlation (ZNCC) between $o_q$ and the code vectors, and choose the one that maximizes it. This approach becomes optimal as noise goes to zero and as the variance of individual code vectors become the same.

For decoding, if observation vectors and code vectors are related according to Equation (6) then:

$$\lim_{\substack{\sigma \to 0 \\ v \to 0}} \left( \underset{1 \leq p \leq N}{\mathrm{argmax}} Pr(o_q | c_p) \right) = \underset{1 \leq p \leq N}{\mathrm{argmax}} ZNCC(o_q, c_p) \quad (8)$$

where:

$$ZNCC(o_q, c_p) = \frac{o_q - \mathrm{mean}(o_q)}{\|o_q - \mathrm{mean}(o_q)\|} \cdot \frac{c_p - \mathrm{mean}(c_p)}{\|c_p - \mathrm{mean}(c_p)\|}, \quad (9)$$

$$ZNCC(o_q, c_p) = \frac{o_q - \mathrm{mean}(o_q)}{\|o_q - \mathrm{mean}(o_q)\|} \cdot \frac{c_p - \mathrm{mean}(c_p)}{\|c_p - \mathrm{mean}(c_p)\|}, \quad (9)$$

v is the variance of the variances of the N code vectors:

$$v = \mathrm{var}(\{\mathrm{var}(c_1), \ldots, \mathrm{var}(c_N)\}), \quad (10)$$

mean( ) and var( ) are over the elements of a code vector, σ is the noise standard deviation, and $Pr(o_q|c_p)$ is defined by marginalizing over ambient contributions and values of T[p,q]:

$$Pr(o_q|c_p) \stackrel{def}{=} \int \int Pr(o_q|c_p, T[p,q] = x, a_q = y) Pr(x) Pr(x) dx dy.$$

where the ZNCC Decoder is defined as:

$$\mathrm{Decode}(o_q, C) = \underset{1 \leq p \leq N}{\mathrm{argmax}} ZNCC(o_q, c_p). \quad (11)$$

For defocused decoding, if observation vectors and code vectors are related according to Equation (7) then:

$$\lim_{\substack{v \to 0 \\ \sigma \to 0}} \left( \underset{1 \leq p \leq N}{\mathrm{argmax}} Pr(o_q | c_p) \right) = \mathrm{Decode}(o_q, CT^q) \quad (12)$$

where the N×N matrix $T^q$ holds the defocus kernel at camera pixel q for all possible corresponding pixels p, i.e., $T^q[i,p]=b_i^{pq}$.

The near-optimality of the ZNCC decoder is advantageous for at least two reasons. First, it suggests that there is potentially no accuracy advantage to be gained by designing decoding algorithms tailor-made for specific codes (see for example FIG. 5). Second, it allows the transformation of the nested position-encoding optimization of Equation (4) into a conventional non-linear optimization. This opens the door to automatic generation of optimized code matrices, as described herein.

Figure 5:
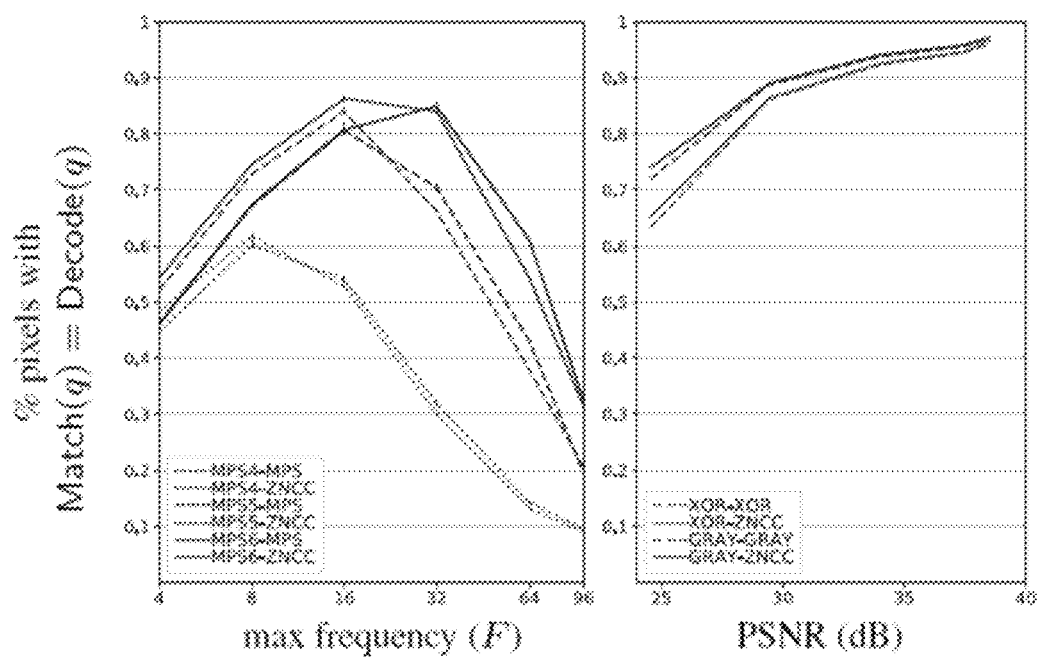
FIG. 5 shows illustrations of ZNCC versus native decoding.

FIG. 5 is an illustration of ZNCC versus native decoding. On the left, K MPS patterns of maximum frequency F are projected onto a known planar target and compute correspondence errors using the ZNCC decoder of the present embodiments and the one using MPS. On the right, a similar comparison for 10 Gray codes and 10 XOR-04 codes, projected along with their binary complement. The binarization technique is used for "native" decoding. Since these codes have no frequency bound, they are plotted against image PSNR. In ad cases, ZNCC decoding yields at least comparable results.

The approach can begin by developing a continuous approximation to the function Error( ) in Equation (3). This function counts the decoding errors that occur when a given code matrix C is applied to a specific scene and imaging condition, i.e., a specific transport matrix T, observation noise e; and ambient vector a. To evaluate the position-encoding objective function on matrix C, S fair samples are drawn over T, e and a:

$$\mathbb{E}[\mathrm{Error}(C,\varepsilon)] = (1/S) \Sigma_{T,e,a} \mathrm{Error}(T,e,a,C,\varepsilon). \quad (13)$$

In some cases, a softmax approximation can be used for decoding of errors. Consider a binary variable that tells whether or not the optimal decoder matched camera pixel q to a projector pixel p. This variable can be approximated by a continuous function in three steps using Equations. (15) to (17) below. Equation (15) states that in order for projector pixel p to be matched to q, the likelihood of p's code vector must be greater than all others. Equation (16) then follows allowing the replacement of likelihoods with ZNCC scores. Lastly, Equation (17) approximates the indicator variable with a softmax ratio; as the scalar μ goes to infinity, the ratio tends to 1 If pixel p's ZNCC score is the largest and tends to 0 otherwise:

$$1(|\mathrm{Decode}(o_q, C) - p| = 0) = \quad (14)$$

$$= 1\left(Pr(o_q|c_p) = \max_{1 \leq r \leq N} Pr(o_q|c_r)\right) \quad (15)$$

$$\underset{\substack{v \to 0 \\ \sigma \to 0}}{=} 1\left(ZNCC(o_q, c_p) = \max_{1 \leq r \leq N} ZNCC(o_q, c_r)\right) \quad (16)$$

$$= \lim_{\mu \to \infty} \frac{\exp(\mu \cdot ZNCC(o_q, c_p))}{\sum_{r=1}^{N} \exp(\mu \cdot ZNCC(o_q, c_r))} \quad (17)$$

$$\stackrel{def}{=} f_\mu(C, o_q, p). \quad (18)$$

To count all correct matches on an epipolar line, the softmax ratio can be evaluated at the true stereo match of every pixel q, and then their sum is computed. Using the notation in Equation (18):

$$\text{Correct}(T,e,a,C) = \Sigma_{q=1}^{M} f_\mu(C, o_q, \text{Match}(q)). \quad (19)$$

Finally, incorporating the tolerance parameter ε to permit small errors in stereo correspondences:

$$\text{Correct}(T,e,a,C,\varepsilon) = \Sigma_{q=1}^{M} \Sigma_{r=-\varepsilon}^{\varepsilon} f_\mu(C, o_q, \text{Match}(q)+r) \quad (20)$$

$$\text{Error}(T,e,a,C,\varepsilon) = M - \text{Correct}(T,e,a,C,\varepsilon). \quad (21)$$

For sampling of scenes and imaging conditions, a direct-only matrix is constructed whose geometric constraints are a matrix G. Firstly, a valid stereo correspondence randomly assigned to each camera pixel according to G; in this way, in some cases, the correspondences can be generated to be restricted to lie in a particular subset of 3D space, governed by matrix G. This specifies the location of the single non-zero element in each column of T (see for example FIG. 3). Then a random value can be assigned to each of those elements independently. The result is a valid direct-only transport matrix, i.e., a sample from family (B) above. To construct a family-(C) sample T' that accounts for projector defocus and geometric constraints, a direct-only matrix T is constructed according to G and then incorporate the depth-dependent defocus kernels.

Figure 3:
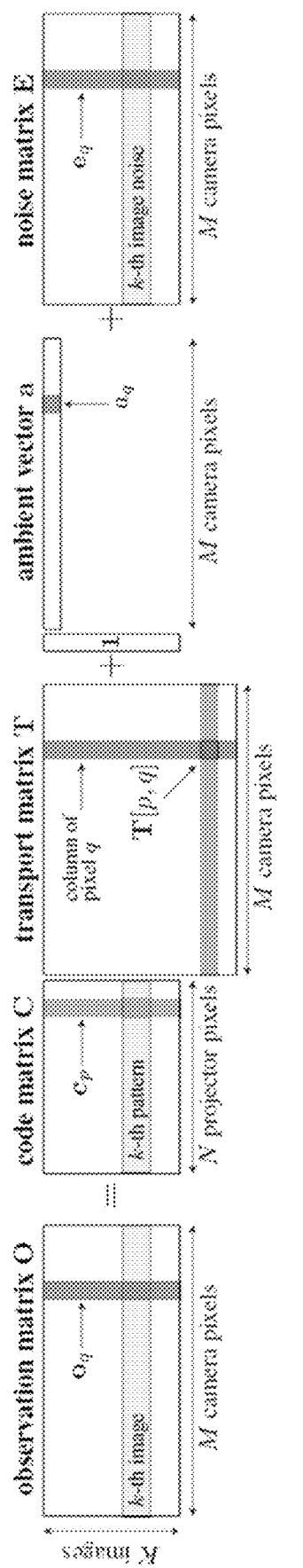
FIG. 3 shows illustrations of generative models of image formation for a single epipolar line across K images.

FIG. 3 is an illustration of an example generative model of image formation for a single epipolar line across K images. Each column of matrix O is an observation vector and each row collects the observations from a single image across all pixels on the epipolar line. All rows are associated with the same input image and all columns are associated with the same camera pixel q. The gray column and row are associated with the same projector pixel p.

For optimization, an Adam optimizer is used to perform stochastic gradient descent on the objective function in Equation (13) with a fixed learning rate, for example, of 0.01. In some cases, user-specified parameters can be (1) the number of projector pixels N; (2) the number of camera pixels M; (3) the number of projection patterns K; (4) the desired tolerance parameter ε; and (5) the geometric constraint matrix G. The result of the optimization is a code matrix $C_\varepsilon^*$.

In an example, the optimization is initialized with a random K×N code matrix C and draw a total of S=500 samples (T,e,a) at iteration 1 to define the objective function of Equation (13). These samples act as a "validation set" and remain fixed until a predetermined error condition is reached (for example, until the error is below a threshold value, until the error is minimized, or until convergence). For gradient calculations, a minibatch is used containing two new randomly-drawn samples per iteration. In an example, optimization converges in around 250 iterations (152 seconds on an 8-core 2.3 GHz laptop for a six-pattern matrix). It was found that increasing the number of samples had no appreciable effect on the quality of $C_\varepsilon^*$ (i.e., the number of decoding errors on other randomly-generated scenes and imaging conditions). In contrast, it was found that the value of the softmax multiplier μ has an appreciable affect there is significant degradation in quality for μ<300, but increasing it beyond that value has little effect. In this example, μ=300 was used for all results shown.

For frequency-constrained projection patterns, many structured-light techniques advocate use of projection patterns with spatial frequency no larger than a user-specified threshold F. This can be viewed as an additional design constraint on the optimal code matrix. To explicitly enforce it, the embodiments can project the code matrix computed at each iteration onto the space of matrices satisfying the constraint.

For advanced sensor noise modeling, although the ZNCC decoder is generally optimal for additive Gaussian noise, the objective function in Equation (13) can incorporate any sensor noise model; for example, samples are simply drawn of e from the camera's noise distribution. The present inventors determined that this can improve significantly the real-world performance of the optimized codes.

Figure 6:
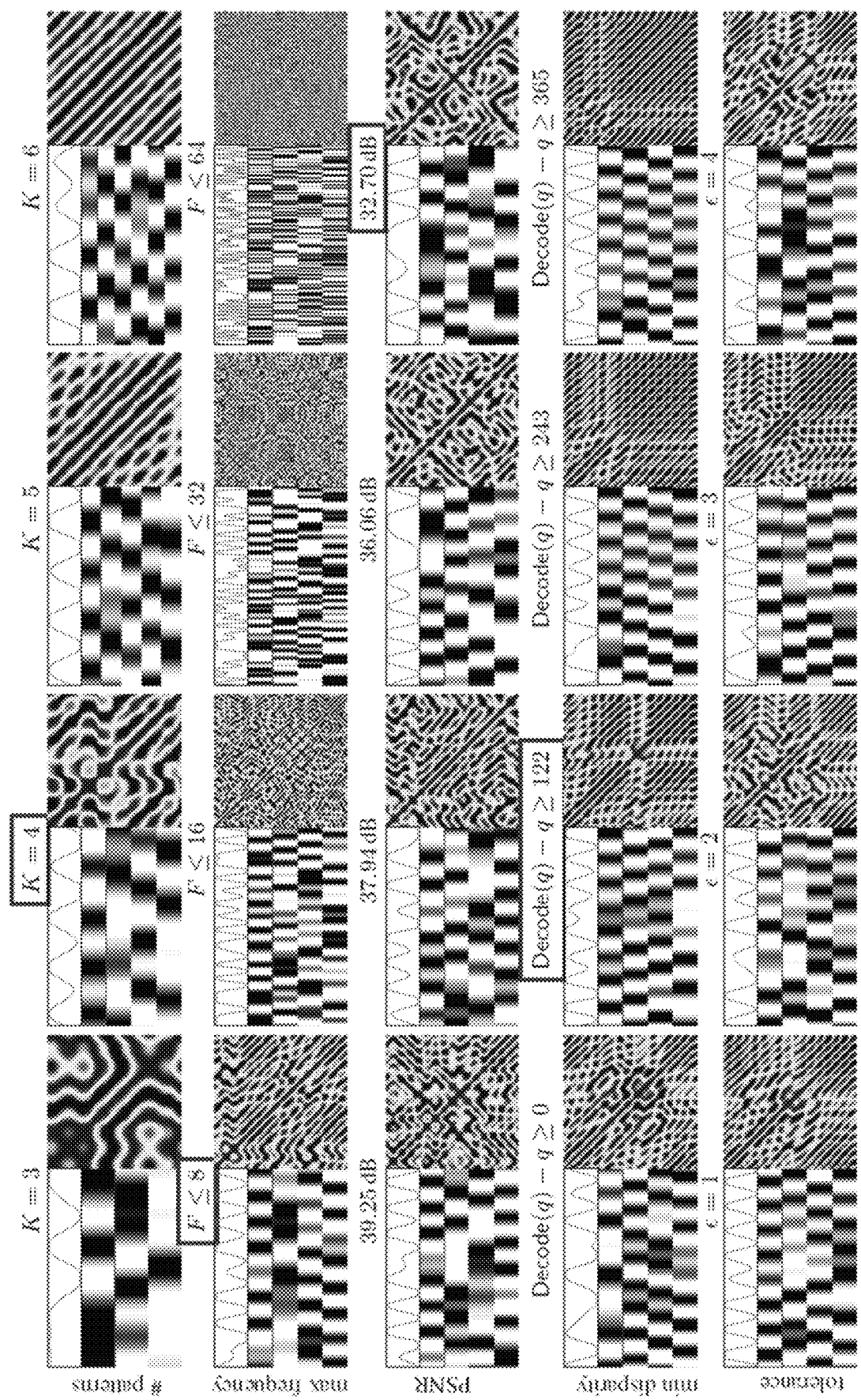
FIG. 6 illustrates a space of optimal codes.

To generate a space of optimal code matrices, in an example experiment of the present embodiments, FIG. 6 shows several code matrices generated by the optimizer. It is clear by inspection that the codes exhibit a very diverse structure that adapts significantly in response to user specifications. Increasing the frequency content (Row 2) produces confusion matrices with much less structure, due to vectors that are more distinctive. Interestingly, codes adapted to lower peak signal-to-noise ratio (PSNR) conditions have confusion matrices with coarser structure. It was not, however, observed that an appreciable difference in the real-world performance of those matrices. Row 3 of FIG. 6 illustrates the codes' adaptation to geometric constraints. Specifically, only points on the plane at infinity can have Decode(q)=q and for 3D points that are closer, a camera pixel can only be matched to a projector pixel on its right (FIG. 4b). Comparing the code matrix for an unrestricted T (second box on Row 3) to that of a lower-triangular T (first column in Row 4), one sees significant re-organization in the confusion matrix; the optimization effectively "focuses" the codes' discriminability to only those code vectors that yield valid 3D points. On the other hand, code matrices that compute approximate, rather than exact correspondences, exhibit coarser structure in their confusion matrix (Row 4).

For the example illustration of FIG. 6:

Row 1: The maximum spatial frequency of the patterns is set to F=4 and the image PSNR to be maximal for our imaging conditions (frame rate=50 Hz, camera gain=1, known read noise, pixel intensity that spans the full interval [0, 1]). Then the optimal code matrix is computed for a 608-pixel projector for different numbers of patterns and no other constraints.

Row 2: Then K=4 is selected and optimal matrices are computed for different bounds on the maximum spatial frequency, with everything else fixed as above.

Row 3: The frequency is set to 8 and optimal matrices are computed for different values of pixel PSNR (i.e., the maximum image intensity gets increasingly smaller), again with everything else fixed as above.

Rows 4 and 5: The same approach is followed for different lower bounds on disparity (i.e., the maximum scene depth is increasingly being restricted), and different tolerances in correspondence error.

In an example experiment described herein, images were captured at 50 Hz and 8 bits with a 1280×1024 monochrome camera supplied by IDS (model IDS UI-3240CP-M), fitted with a Lensation F/1.6 lens (model CVM0411). For pattern projection, a 100-lumen DLP projector by Keynote Photonics (model LC3000) was used with a native resolution of 608×684 and only the red LED turned on. Gamma correction was disabled, verified the system's linear radiometric response, and measured the sensor's photon transfer curve. This made it possible to get a precise measure of PSNR independently for each pixel on the target. Three different models of pixel noise were experimented with for position-encoding optimization: (1) additive Gaussian, (2) Poisson shot noise with additive read noise, and (3) exponential noise with additive read noise.

Figure 7:
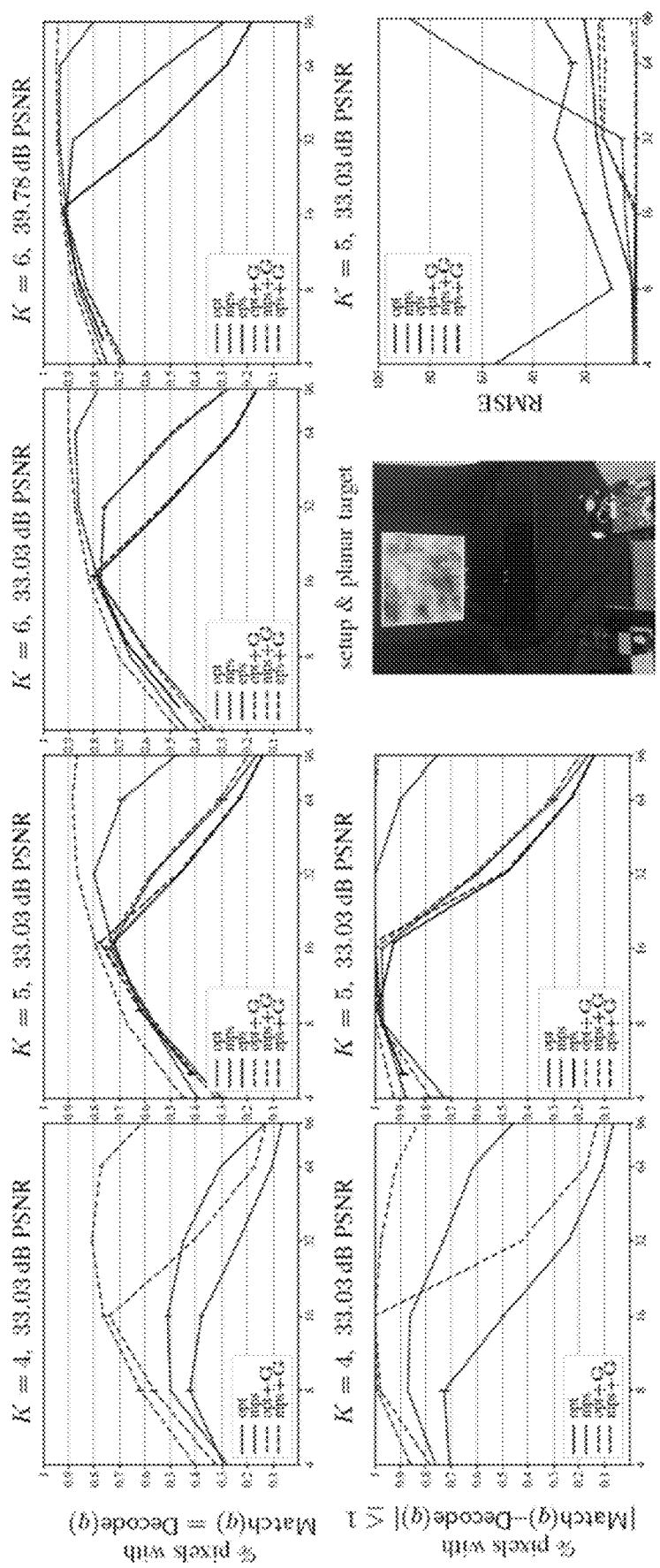
FIG. 7 illustrate plots showing quantitative evaluation.

For ground truth, a random noise pattern of bounded frequency was printed onto a white sheet of paper and placed on a planar target 60 cm away from the stereo pair (see for example FIG. 7, bottom row, third column). Two different pattern sequences were used to obtain "ground-truth" disparity maps: 160 conventional phase-shifted patterns and 20 XOR patterns (including the complement codes). The aperture was adjusted so that the maximum image intensity was 200 for a white projection pattern (i.e., a high-PSNR regime at the brightest pixels) and focused the lens on the target. For 97% of pixels, the disparities were identical in the two maps; the rest differed by ±1 disparity. Thus, correctness above 97% against these maps is not significant. All of the code matrices were optimized for these high-PSNR conditions with the exponential-plus-read-noise model.

For quantitative evaluation, focus was placed on the most challenging cases: very small number of patterns and low PSNR. To evaluate low-PSNR performance, the aperture was reduced so that the brightest pixel intensity under a white projection pattern is 60, and the pixels are counted whose correspondences are within ε of the ground truth. The example of FIG. 7 compares the optimized code matrices against those of MPS and EPS, using the same ZNCC decoder for all codes. Several observations can be made from these results. First, the code matrices outperform MPS and EPS in all cases shown. Second, the codes perform significantly better than EPS and MPS at higher spatial frequencies. This is despite the fact that those coding schemes are specifically designed to produce high-frequency patterns. It is also worth noting that the performance degradation of MPS and EPS at high frequencies cannot be explained by camera defocus because the camera's aperture was small in these experiments (i.e., large depth of field). Third, geometric constraints confer a major performance advantage to all codes at low pattern counts. The gain, however, is higher for the codes of the present embodiments since they are optimized precisely for them. Fourth, code matrices that are geometry-constrained and optimized for a small error tolerance tend to produce low root-mean-squared errors (RMSE) for most frequencies.

In the top row and the first two columns of the bottom row of FIG. 7, each data point represents three independent acquisitions with the same pattern sequence. Error bars indicate the smallest and largest fraction of correct correspondences in those runs. $\varrho=0$ was used for optimization in the top row and $\varrho=1$ in the bottom. Solid lines show results when no geometry constraints are imposed on code optimization and on decoding. Dashed lines show what happens when a depth-constrained geometry matrix G is used. For EPS and MPS, the constraint is used only for decoding, i.e., it is searched among the valid correspondences for the one that maximizes the ZNCC score. Codes, on the other hand, are optimized for that constraint and decoded with it as well. The bottom row of FIG. 7 illustrates RMSE plots.

Figure 8:
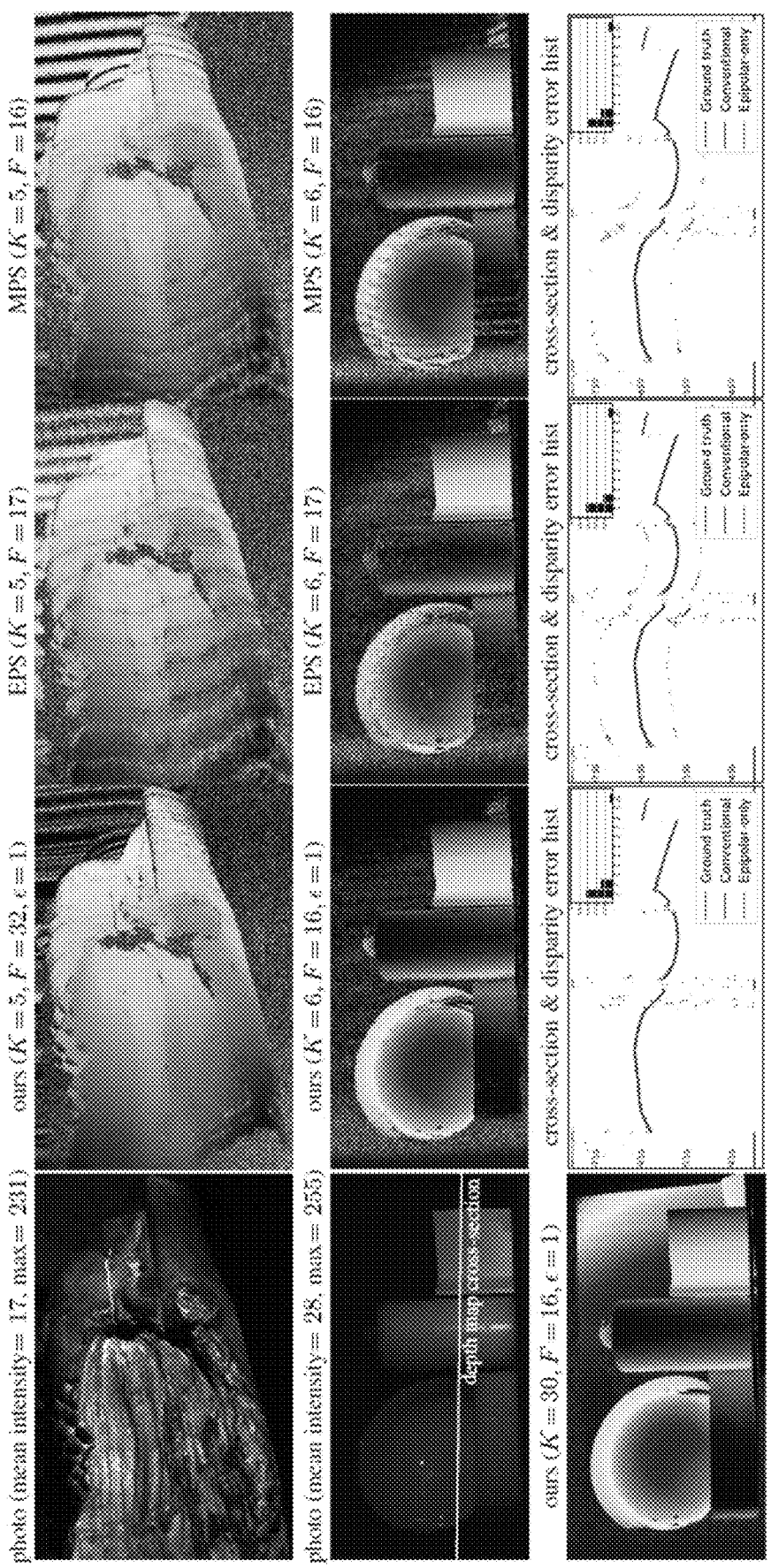
FIG. 8 is an illustration of qualitative comparisons.

The qualitative results of the example experiments for reconstructions of several objects are shown in FIG. 1 (using four patterns) and FIG. 8 (using five and six patterns). The comparison in FIG. 1 indicates that computing geometry-constrained codes has a clear effect on the quality of the results, a trend observed in the quantitative comparisons as well. In FIG. 8, reconstruction of a dark scene was specifically chosen, as well as a scene with significant indirect light, to compare performance under low-PSNR conditions and general light transport. It was observed that the depth maps have significantly fewer outliers than EPS and MPS and are less influenced by depth discontinuities. Moreover, despite not being specifically optimized for indirect light, better depth maps are obtained there as well.

FIG. 8 illustrates qualitative comparisons. Depth maps were acquired for the scenes on the left using three approaches, with the same ZNCC decoder and the same triangular geometry matrix G. For each approach, the scenes were reconstructed for several maximum frequencies in the range and depth maps for each approach's best-performing frequency are shown. In the top row of FIG. 8, illustrated is reconstruction of a dark, varnished and sculpted wooden trunk with five patterns. In the middle row of FIG. 8, illustrated is a reconstruction of a scene with significant indirect transport (a bowl, candle, and convex wedge) using previous approaches to imaging using six patterns. The bottom row of FIG. 8 shows depth maps acquired with many more patterns, along with cross-sections of the above depth maps and a histogram of disparity errors. For reference, the cross-sections of depth maps acquired using epipolar-only imaging with the exact same patterns are included, as well as "ground truth" depth maps acquired with 160 shifted cosine patterns of frequencies 16 to 31 using epipolar-only imaging.

Figure 10:
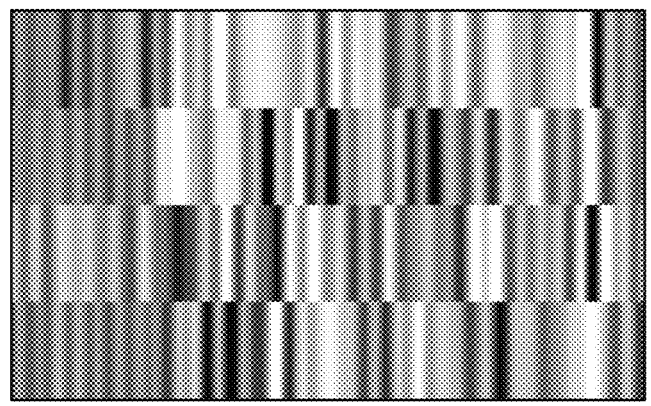
FIG. 10 illustrates an exemplary code matrix according to embodiments described herein.

The top of FIG. 1 illustrates a projection pattern that is a 1D image projected along a projectors rows. A sequence of them defines a code matrix (as shown for example in FIG. 10), whose columns encode pixel position. A framework for computing stereo correspondences using optimal code matrices is generated on the fly. These matrices minimize the expected number of stereo errors that occur when the individual matrix columns are not very distinctive. The middle of FIG. 1 illustrates a whole space of optimal matrices exists, for different numbers of projection patterns, image signal-to-noise ratio, spatial frequency content (sample patterns shown above), etc. The bottom of FIG. 1 illustrates two automatically-generated four-pattern sequences are used to compute the depth map of the object shown on left. Both are optimized for a one-pixel tolerance for stereo errors, without (middle) and with (right) a bounding-box constraint.

Advantageously, the embodiments described herein, with the position-encoding objective function, can be viewed as an extremely simple one-layer neural network.

Embodiments described herein provide a method and system to provide three-dimensional (3D) imaging using a projector with a set of patterns and a camera to capture intensities of light reflected from a scene to create accurate 3D models of that scene.

Generally, the principle of triangulation is used to determine correspondence between points or pixels projected by the projector and points of pixels captured by the camera. In this way, the system needs to determine approximately every point on the projector correspondence with a point on the camera.

In order to determine this correspondence, a process of projecting different patterns onto the scene and capturing the reflected light at the camera is repeated. For each pixel, the camera senses different intensities by measuring intensities for each respective projected pattern, knowing what the intensity of the pixel that was projected. Typically, the correspondence of pixels can be determined by projecting lots and lots of patterns of light. However, this can be problematic where there is not a lot of time or energy, where patterns need to be projected quickly (such as for moving objects), or where imaging is done outdoors, and it is not desirable to expend lots of energy projecting very bright patterns.

Embodiments described herein can advantageously be used to get good geometry determinations of the scene by determining correspondence with a relatively low amount of patterns, for example 20 patterns, and a relatively low amount of energy.

Embodiments described herein can be used to design patterns that are custom designed for a particular system arrangement and setting. For example, where it is known where the camera is positioned and where the projector is positioned. In this case, tailored patterns can be determined that optimize for that system very quickly, for example within a couple minutes. Embodiments described herein can be used to determine geometry in a way that is relatively robust to noise, especially for low light conditions that have more noise relative to signal.

Additionally, embodiments described herein can be used to generate correspondence algorithms that are independent of the patterns that are being generated. Thus, algorithms presented herein provide pixel correspondence that is simple and general, and can be used regardless of what patterns are used. Thus, in some cases, the correspondence algorithms can make any structured light system more accurate by capturing geometry for any pattern.

Also provided herein is a method and system for determining correspondence regardless of the projector and camera used, and their respective settings. Instead of assuming information about the camera and the projector are known, methods of the present embodiments allow the system to discover such properties of the camera and the projector.

Embodiments of the method and system use neural networks to learn optimal projection patterns to generalize previous approaches and give significant improvements in accuracy.

In a method of the present embodiments, an object of known geometry is placed in the scene, with the projector projecting onto it and the camera receiving light reflected off it. In a particular case, the object is a planar board with one of its faces directed between the projector and the camera. In a particular case, this planar board has a pattern (texture) affixed to it; for example, a random greyscale image.

In this example, a planar board is used because the geometry of the board is easily known. The texture is used because it can force the system to resolve correspondence regardless of what a local neighborhood of a particular point looks like.

In an exemplary case, determining correspondence for each pixel received by the camera on the image with a corresponding projector pixel can be done by considering a neighborhood of that pixel, for example typically 3-pixels-wide-by-3-pixels-high. In this example, the projected patterns are separated one-dimensional strips (columns) that are 1-pixel-wide with 3 or more pixels in height. In some cases, each column can have the same intensity.

In this example, to train the neural network, many patterns are projected onto the known planar board to most or all of the points on the planar board; in some cases, 30, 50, or 100 patterns depending on the desired accuracy. With all these projected patterns, it can be expected that resulting captured training dataset will likely give reasonably good geometry. Then the system fits the planar surface to the captured training dataset. Then for each pixel, because the system fits an object of known geometry to the captured training dataset, the system can know which captured pixel generally corresponds to each projected pixel. Because it is a known planar board, even if there are a few outliers, the system can use it as a ground truth.

The system can project 'K' patterns onto the scene of known geometry to yield potentially thousands of training samples (one per image row). The system can then capture images of the scene and randomly sample, for example, 15% of rows. A gradient is determined using:

$$\frac{d \text{ Error}}{dC} = \frac{\partial \text{ Error}}{\partial O} \frac{\partial O}{\partial C} + \frac{\partial \text{ Error}}{\partial C} \text{ where}$$

$$\frac{d \text{ Error}}{dC}$$

is evaluated at the samples.

In this way, measurement of how a small intensity change at pixel q of projection pattern k affects the intensity of camera pixel p. The system thus projects the pattern k in a current iteration and captures the image. The system can then modify the pattern by adding a small value to pixel q. The modified pattern is projected and a new image is captured. The above gradient is determined from their difference.

In this way, the encoding scheme is generated in real time, and optimized for a particular setup and signal-to-noise ratio of actual capture session.

To determine accuracy of the neural network, the system can project, for example, four predetermined patterns onto the planar board. The patterns are captured by the pixels of the camera, passed through the neural network, and correspondence is outputted. This correspondence can be checked to ensure that it is correct with respect to what is expected for a planar surface. This checking can produce a loss function that can be optimized against the ground truth. In this way, the system can trust that the geometry is captured accurately.

When accuracy is evaluated, the system determines what fraction of pixels get the correspondence exactly correct, or determines an area to see how well the neural network performs in matching pixels together. For example, $\epsilon_0$ is a measurement of how many are exactly correct, $\epsilon_1$ is a measurement of how many are correct within one pixel away, $\epsilon_2$ is a measurement of how are correct within two pixels away, and so on.

In an example of the above, four patterns can be used and captured as input to the neural network. With a 3×3 matrix of captured pixels, and four different patterns, there are 36 pixels in total that describes a local neighborhood across all the projected patterns; thus, a 36 dimensional vector. This 36 dimensional vector can be passed through, for example, a neural network having convolutional layers of 50 dimensions. The system then does the same for the projected pixels. In this example, a column of 3 pixels high, and four different patterns, produces a 12 pixel dimensional vector. This vector is passed through into the 50 dimensional convolutional layers.

In this example, the pixels can be matched by passing the above output through a Zero-mean Normalized Cross-Correlation (ZNCC). This output is then passed through softmax to determine which neighborhoods provide most likely correspondence. In this way, the neural network can learn weights of most likely correspondence between the pixels. In experimentation, this gives a high degree of accuracy, for example, at or above 70% accuracy.

Advantageously, the embodiments described herein can start with random patterns, and cameras and projectors with unknown properties, and learn pixel correspondence itself. Thus, allowing the system to determine depth and geometry without having to use specified equipment even though different types of cameras and projectors work differently even with the same structured light patterns. This allows a user to swap out different equipment or patterns as necessary.

Additionally, conventional systems typically use greyscale cameras and projectors. With the present embodiments, the system can use color patterns and color cameras, which can possibly mean using less patterns and thus having comparably better performance.

In some cases, it may be useful to use a material of the known training object to train the system if the user is ultimately trying to scan a class of objects with that material because it can provide even better performance and accuracy.

Figure 9:
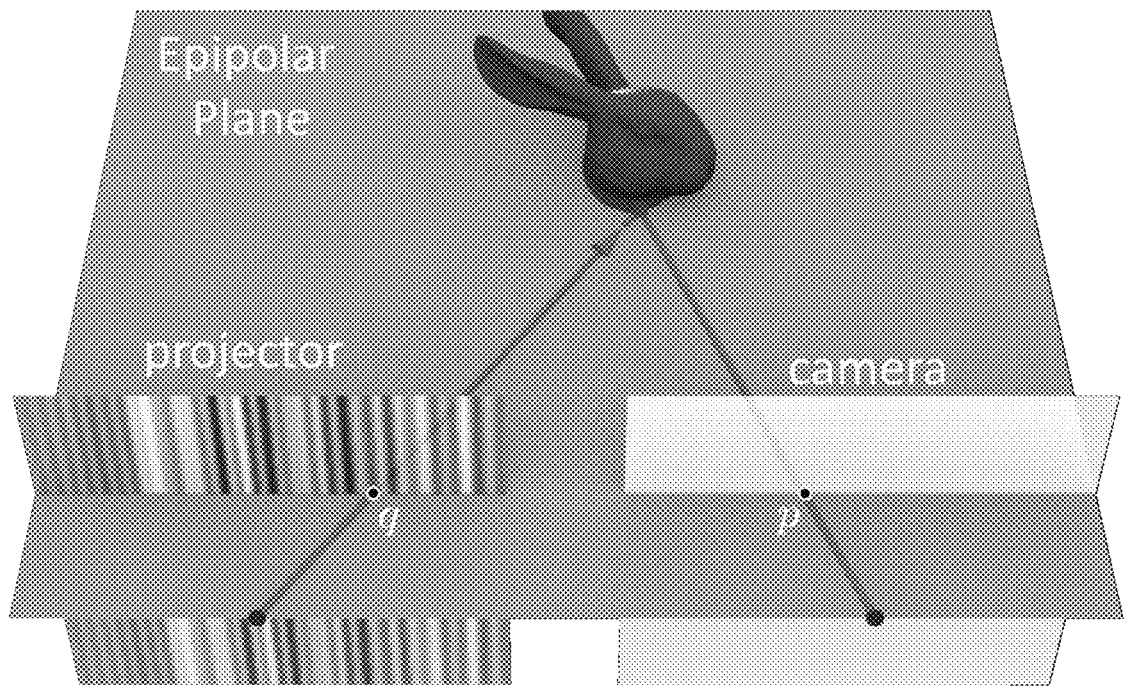
FIG. 9 illustrates an exemplary set up of an embodiment of the system described herein.

FIG. 9 illustrates an exemplary set up of an embodiment of the system described herein. The projector projects a stripped pattern on an object (rabbit). Each pixel projected is received by a pixel on the camera in an approximately same epipolar plane. In this way, the system can capture ≥1 images under active illumination to find stereo correspondence of each camera pixel p.

The system of the present embodiments is thus able to reconstruct (almost) anything, quickly, with a low power source, at high accuracy (for a given system), and with relatively high spatial density. Additionally, the system may be able to generalize these abilities to new imaging systems without any calibration or new programming, or prior training data.

In some cases, the system can use post-processing; for example, clipping, local cleanup, global optimization, or the like.

Figure 12:
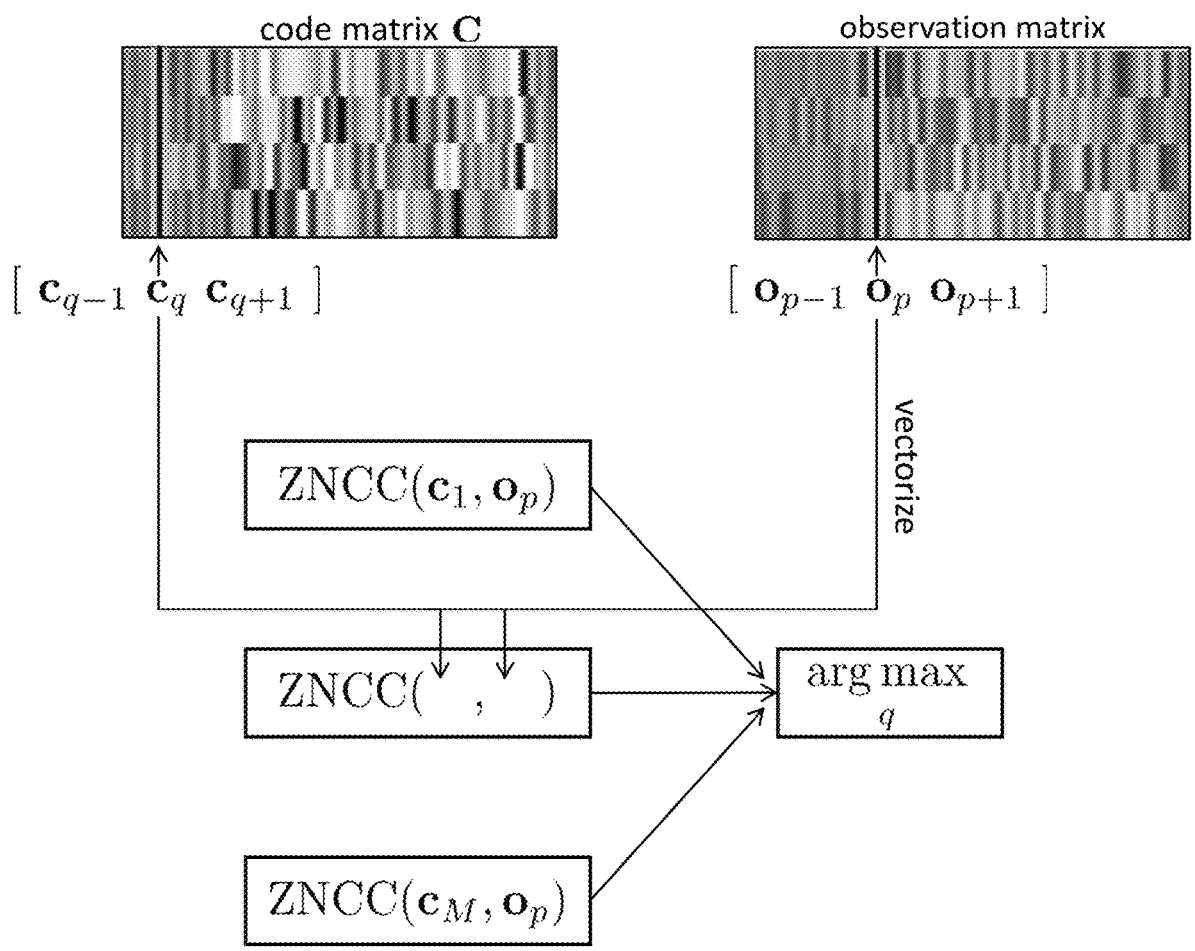
FIG. 12 illustrates an example diagram of embodiments of the system for decoding using 3-pixel neighborhood centered at each pixel.

FIG. 12 illustrates an example diagram of embodiments of the system for decoding using 3-pixel neighborhood centered at each pixel.

Figure 13:
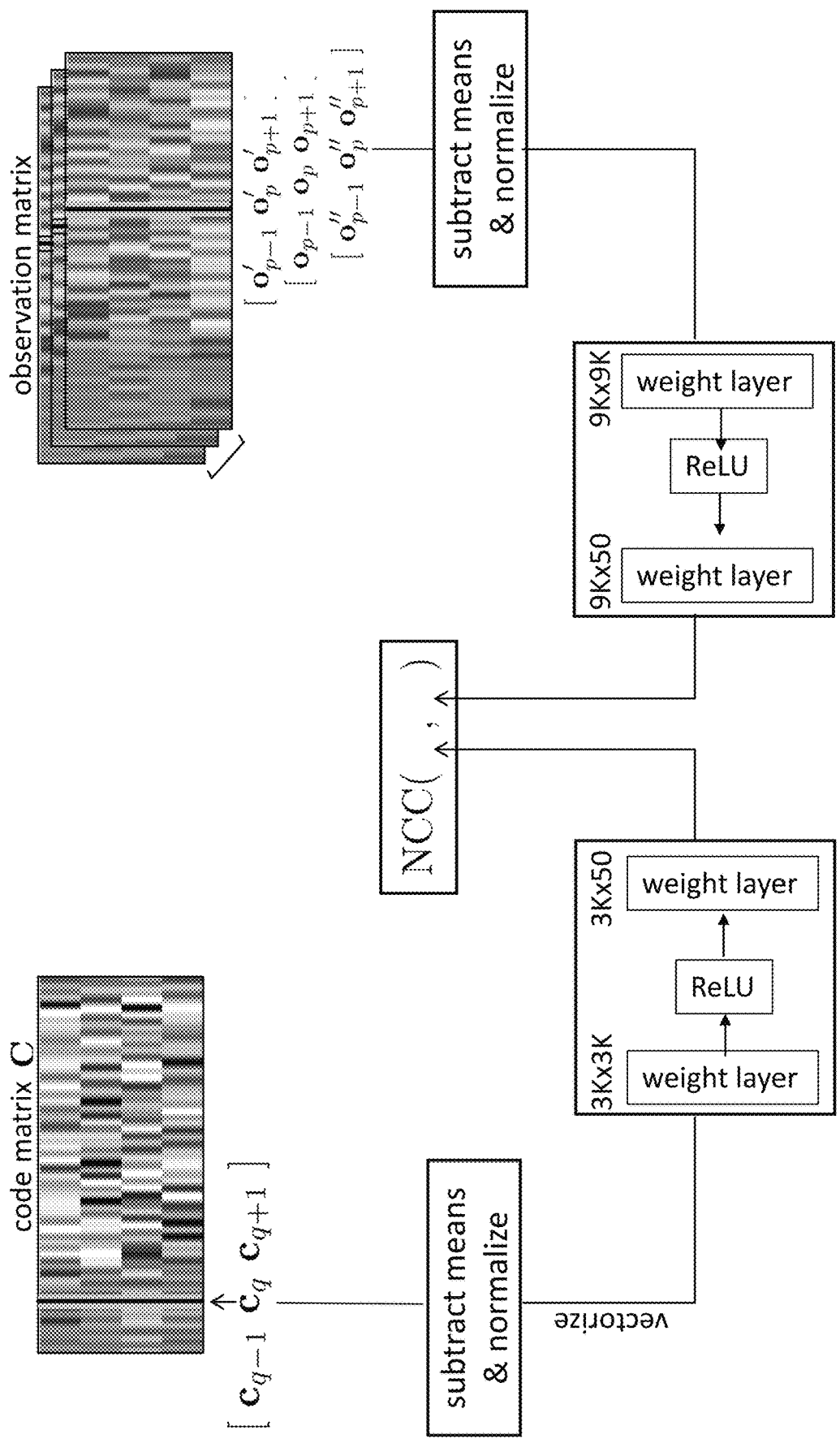
FIG. 13 illustrates an example diagram of embodiments of the system for neural net decoding.

FIG. 13 illustrates an example diagram of embodiments of the system for neural net decoding.

In embodiments of the present disclosure, the present inventors developed optical auto-tuning for optimal performance of a structured-light imaging system. Optical auto-tuning allows for optimization that can learn on the fly, at least, (1) optimal illuminations to use for multi-shot depth acquisition of a static scene, and (2) optimal mapping from the captured shots to the scene's depth map. See for example FIG. 16 which illustrates an example experiment performed by the present inventors using present embodiments. In the top row of FIG. 16, an example of optimal structured light captured with smartphones is shown. A randomly-colored board was positioned in front of an Optoma 4K projector and a Huawei P9 phone (left-top), auto-tuned them for five color-stripe patterns (middle-top), and used them to reconstruct a new scene (insert of top-right). In the middle and bottom rows of FIG. 16, optimal structured light with low-end projectors are shown. An LG PH550 projector and a monochrome IDS-UI3240CP camera were auto-tuned for four grayscale patterns with a board described herein, and then reconstructed the scene. Color-coded disparity maps were acquired in four different ways: with auto-tuned patterns according to present embodiments ("ours") and an optimized algorithm was applied to raw images; and three other approaches with the best-performing parameter settings for each, and linearized images. Only pixels with zero disparity error are shown in each depth map, along with the percentage of zero-error pixels.

In the present embodiments, optical auto-tuning can proceed by controlling in real-time the system it is optimizing, and capturing images with it. In some cases, the only inputs to the optimization required are the number of shots and an optional penalty function to be applied to the depth error of each pixel. In some cases, present embodiments of optical auto-tuning can be completely automatic, requiring no manual initialization, parameter tuning, system calibration, or prior training data. In some cases, present embodiments of optical auto-tuning can minimize a rigorously-derived estimate of the expected reconstruction error for the system at hand. In some cases, present embodiments of optical auto-tuning can optimize this objective without having a precise image formation model for the system or the scenes of interest.

In some cases of the present embodiments of optical auto-tuning, the hardest computations in the optimization, such as calculating derivatives that depend on an accurate model of the system, can be performed in the optical domain, which provides demonstrable computational efficiency. Advantageously, present embodiments of optical auto-tuning can treat the imaging system as a perfect (or near perfect) "end-to-end model" of itself, with realistic noise and optical imperfections all included. See for example FIG. 17, which illustrates an example implementation of an embodiment of optical auto-tuning. Differentiable imaging systems allow the system to "probe" their behaviour by differentiating them in the optical domain, i.e., by repeatedly adjusting their control vector, taking images, and computing image differences. Projector-camera systems, as shown in the figure, are one example of a differentiable system where projection patterns play the role of control vectors. Many other combinations of programmable sources and sensors can have this property, as described herein.

The present disclosure provides, in an embodiment, an optimization approach that runs partly in the numerical and partly in the optical domain. Optical auto-tuning starts from a random set of K illuminations; uses them to illuminate an actual scene; captures real images to estimate the gradient of the expected reconstruction error; and updates its illuminations according to Stochastic Gradient Descent (SGD). In some cases, the system's light sources can be flexible enough to allow small adjustments to their illumination and an independent mechanism is available to repeatedly acquire higher-accuracy (but can be still noisy) depth maps of that scene.

Previous approaches and techniques generally require very precise models of the system or extensive training data, whereas the present embodiments may not require either. Further, the present embodiments advantageously replace "hard" numerical computations with "easy" optical ones. Further, optical auto-tuning can, in some cases, train a small neural network with a problem-specific loss; noisy labels and noisy gradients; and with training and data-augmentation strategies implemented partly in the optical domain.

Advantageously, present embodiments of optical auto-tuning allow for a common computational framework for the optimization of many types of systems, from grayscale, to color, to coded imaging; making optimization possible regardless of modality. Advantageously, present embodiments of optical auto-tuning remove many of the calibration steps required for high accuracy structured-light imaging (color and radiometric calibration, defocus modeling, and the like). Advantageously, present embodiments of optical auto-tuning produce patterns of much higher frequency than used by other approaches. This suggests that the bandwidth of spatial frequencies useful for structured light is far broader and can lead to accuracy improvements when exploited.

Figure 14:
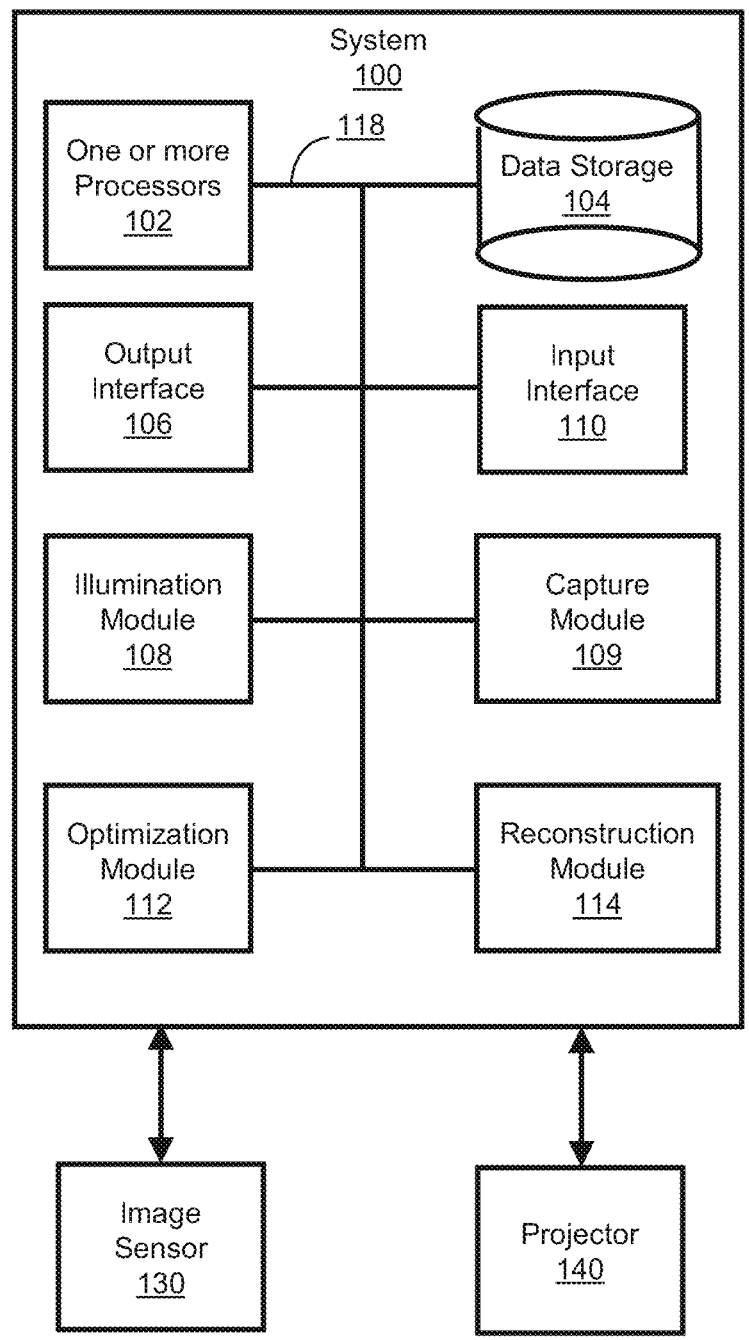
FIG. 14 is a block diagram of a system for optimizing depth imaging, in accordance with an embodiment.

Referring now to FIG. 14, a system 100 for optimizing depth imaging of a scene, in accordance with an embodiment, is shown. As understood by a person skilled in the art, in some cases, some components of the system 100 can be executed on separate hardware implementations. In other cases, some components of the system 100 can be implemented on one or more general purpose processors that may be locally or remotely distributed.

FIG. 14 shows various physical and logical components of an embodiment of the system 100. As shown, the system 100 has a number of physical and logical components, including one or more processors 102, data storage 104, an output interface 106, an input interface 110, an illumination module 108, a capture module 109, an optimization module 112, a reconstruction module 114, and a local bus 118 enabling the components to communicate each other. In an embodiment, the modules can be executed on the one or more processors 102. In other embodiments, the modules can be implemented in specific hardware or via a dedicated processor. In some cases, the modules can be combined, separated into more modules, or implemented on remote systems.

The output interface 106 enables another electronic device or computing device to transmit data or receive the outputs from the system 100, as described herein. On some embodiments, the output interface 106 enables users to view such outputs, via for example, a display or monitor. In some cases, the outputs from the system 100 can also be stored in the data storage 104. The input interface 110, alone or in conjunction with the output interface 106, taking direction from the illumination module 108 and/or the capture module 109, can communicate with certain devices, such as an image sensor 130 and a projector 140, which can be internal or external to the system 100. The image sensor 130 can be any suitable image acquisition device; for example, a visible spectrum camera, an infrared camera, a smartphone camera, a per-pixel coded-imaging camera, or the like. The projector 140 can be any suitable device for projecting illumination, in any suitable spectrum, onto the scene; for example, a digital micromirror device (DMD)-based projector, a laser-based projector, a Liquid Crystal Technology on Silicon (LCoS)-based projector, and the like. The projector 140 having a level of granularity or spatio-temporal resolution as described herein.

The projector 140 projects structured light onto a scene and can be used to control image formation in an extremely fine-grained, almost continuous, manner. In some cases, the projector 140 can adjust a scene's illumination at the resolution of individual gray levels of a single projector pixel. In some cases, the projector 140 can comprise spatial light modulators that can do likewise for phase or polarization. In some cases, the projector 140 can comprise programmable laser drivers that can smoothly control the temporal waveform of a laser at sub-microsecond scales. In some cases, the projector 140 can comprise sensors with coded-exposure or correlation capabilities can adjust their spatio-temporal response at pixel- and microsecond scales.

The system 100 can be used to optimize programmable imaging systems that use the projector 140 for fine-grained control of illumination and sensing. For example, the system 100 can approximate a differentiable imaging system. Generally, differentiable imaging systems have the property that a small adjustment to their settings can cause a small, predictable change to the image they output (as exemplified in FIG. 17).

In the present embodiments, an imaging system is considered differentiable if the following two conditions hold:
1) The behaviour of its sources, sensors and optics during the exposure time is governed by a single N-dimensional vector, called a control vector, that takes continuous values; and
2) For a stationary scene $\mathcal{S}$, the directional derivatives of the image with respect to the system's control vector; i.e., $$D_a img(c, \mathcal{S}) \stackrel{\text{def}}{=} \lim_{h \to 0} \frac{img(c + ha, \mathcal{S}) - img(c, \mathcal{S})}{h},$$

are well defined for control vectors c adjustments a, where img(c, $\mathcal{S}$) is the noise-less image.

Advantageously, differentiable imaging systems open the possibility of optical auto-tuning, iteratively adjusting their behaviour in real time via optical-domain differentiation, to optimize performance in a given task.

For depth imaging, the optimization module 112 determines a solution to the optimization. The determination uses:
  a differentiable imaging system that outputs a noisy intensity image i in response to a control vector c;
  a differentiable reconstruction function that estimates a depth map d from a sequence of K≥1 images acquired with control vectors $c_1, \ldots, c_K$ $$d = rec(i_1, c_1, \ldots, i_K, c_K, \theta)$$

where θ Is a vector of additional tunable parameters (which comprise 'reconstruction parameters' referred to herein); and
  an error function err( ) that penalizes differences between the estimated depth map and the ground-truth depth map g.

The optimization module 112 determines the solution to the optimization by determining the parameters that minimize expected reconstruction error:

$$c_1, \ldots c_K, \theta = \underset{c_1, \ldots, c_K, \theta}{\operatorname{argmin}} \mathbb{E}_{scenes, noise}[err(d - g)]$$

with expectation taken over noise and a space of plausible scenes.

Figure 15:
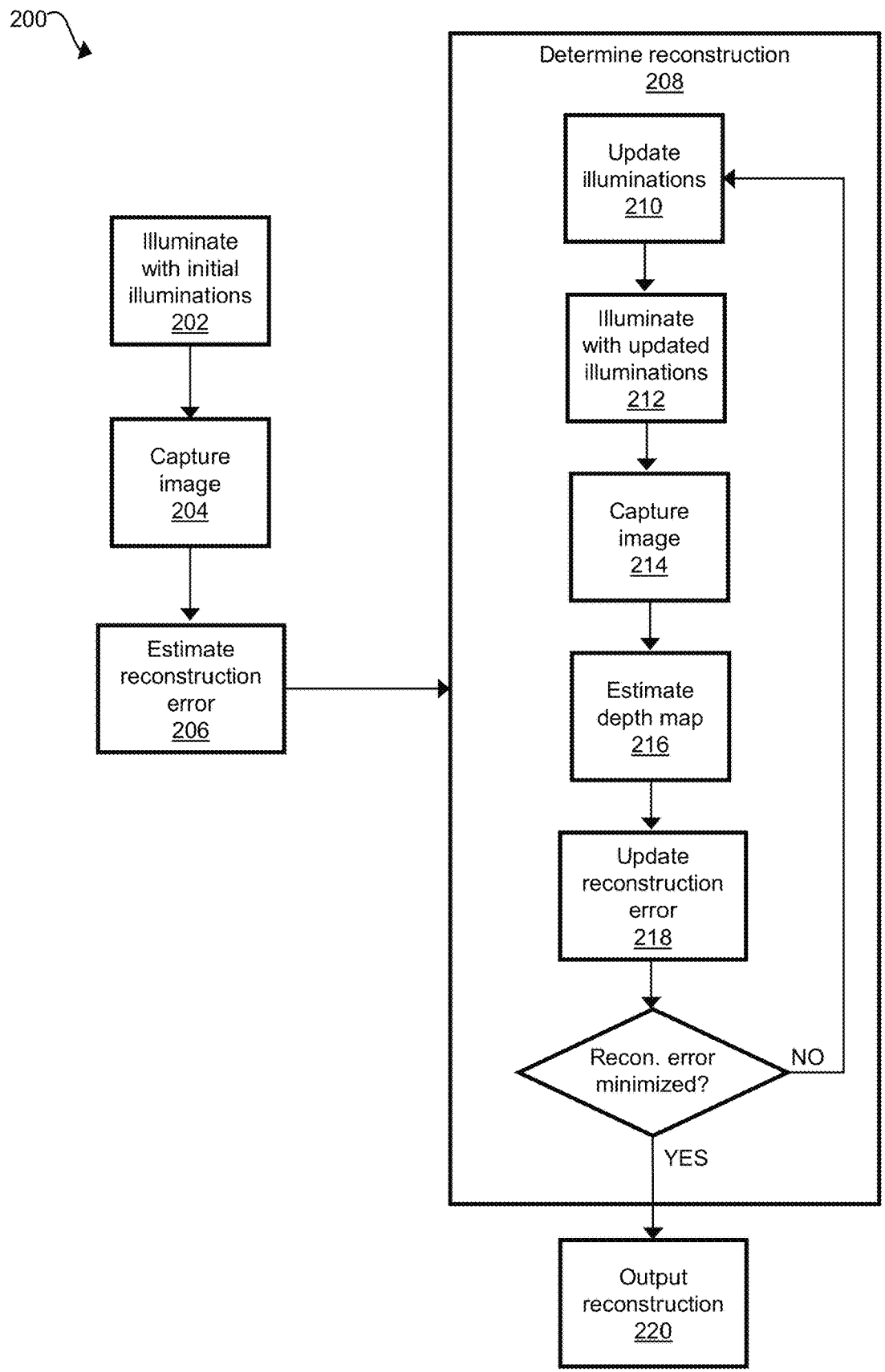
FIG. 15 is a flow diagram of a method for optimizing depth imaging, in accordance with an embodiment.

FIG. 15 shows a method 200 for optimizing depth imaging of a scene, in accordance with an embodiment.

At block 202, the illumination module 108 directs the projector 140 to illuminate the scene with an initial set of illuminations. At block 204, the capture module 109 communicates with the image sensor 130 to capture an image of the scene during the illumination. At block 206, the optimization module 112 estimates a gradient of a reconstruction error. At block 208, the reconstruction module 114 determines a reconstruction, the reconstruction comprising iteratively performing until the reconstruction error is minimized: at block 210, the optimization module 112 updates the illuminations by minimizing the gradient of the reconstruction error; at block 212, the illumination module 108 directs the projector 140 to illuminate the scene with updated illuminations; at block 214, the capture module 109 communicates with the image sensor 130 to capture an updated image of the scene during the illumination; at block 216, the reconstruction module 114 estimates a reconstruction depth map; and at block 218, the optimization module 112 estimates an updated gradient of the reconstruction error. At block 220, the output interface outputs the reconstruction.

In some cases, the initial set of illuminations can be selected at random. In some cases, the optimization module 112 further determines a control vector for each of the sets of illuminations, the control vector comprising a pattern for the illuminations. In further cases, the reconstruction module 114 further determines a differentiable reconstruction function to estimate a depth map for each image captured, the differentiable reconstruction function comprising the respective control vectors. In further cases, estimating the gradient of the reconstruction error comprises penalizing a difference between the estimated reconstruction depth map and a ground-truth depth map. In further cases, the ground-truth depth map is determined using a randomly-textured surface. In further cases, minimizing the gradient of the reconstruction error comprises determining the control vectors that minimize the reconstruction error using a trainable Stochastic Gradient Descent (SGD). In further cases, the gradient of the reconstruction error is determined using an image Jacobian comprising the control vectors and the pixels in the respective captured images. In further cases, estimating the reconstruction depth map comprises determining directional derivatives using the image Jacobian.

In further cases, determining the reconstruction further comprising determining stereo correspondence, comprising: treating intensities observed at a neighbourhood of pixels of the captured image as a feature vector; comparing the captured pixel intensities to a vector of intensities at linear segments of the structured light pattern projected at the scene; and using a trained artificial neural network, selecting portions of the captured image that are most similar to portions of the structured light pattern that is most similar according to the zero-mean normalized cross-correlation (ZNCC) score.

In the present embodiments, it is assumed that both images and depth maps are represented as row vectors of M pixels. Different combinations of light source, sensor, reconstruction function and error function lead to different instances of the system optimization problem (as exemplified in FIG. 18). Correlation time-of-flight (ToF) systems, for example, capture K≥3 images of a scene, and vectors $c_1, \ldots, c_K$ control their associated laser modulation and pixel demodulation function. In active triangulation systems that rely on K images to compute depth, on the other hand, the control vectors can be the projection patterns (as exemplified in FIG. 17). In both cases, the reconstruction function can be used to map the K observations at each pixel to a depth (or stereo disparity) value. Also, in both cases, the reconstruction function can be controlled by a set of tunable reconstruction parameters, defined as θ and described herein.

FIG. 18 shows examples of devices and functions compatible with the present embodiments. As the error function is a sum of pixel-wise error penalties, several example options for the pixel-wise penalty ρ( ) are shown, each leading to a specified depth-Imaging behaviour for the optimized system.

In the hypothetical case where there is a perfect forward model for an image formation process, there would be a perfect model for (1) the system's light sources, optics, and sensors, (2) the scenes to be imaged, and (3) the light transport between them. In this case, optimization techniques, for example, Stochastic Gradient Descent (SGD), allow for minimization of a system-optimization objective numerically. By approximating it by a sum that evaluates reconstruction error for realistic noise and for a large set of fairly-drawn, synthetic training scenes. Then its gradient is evaluated with respect to the unknowns θ, $c_1, \ldots, c_K$; and SGD can be applied to (locally) minimize it.

Replacing the first expectation in the error function with a sum, there is provided:

$$\mathbb{E}_{scenes,noise}[err(d-g)] \approx \frac{1}{T}\sum_{t=1}^{T} \mathbb{E}_{noise}[rr(d^t - g^t) \mid S^t.] \stackrel{def}{=}$$

$$\frac{1}{T}\sum_{t=1}^{T} xerr(d^t - g^t, S^t)$$

where $d^t$, $g^t$ are the reconstructed shape and ground-truth shape of the t-th training scene, $S^t$, respectively, and xerr( ) is its expected reconstruction error.

Practically, there may not be sufficient information about the imaging system and its noise properties to reproduce them exactly, or the forward image formation model may be too complex or expensive to simulate. Differentiable imaging systems of the present embodiments can allow the system 100 to overcome these technical limitations by implementing the difficult gradient calculations directly in the optical domain.

$$\nabla_\theta xerr = \frac{\partial xerr}{\partial rec}\frac{\partial red}{\partial \theta}$$

$$\nabla_{c_k} xerr = \frac{\partial xerr}{\partial rec}\frac{\partial rec}{\partial c_k} + \frac{\partial xerr}{\partial rec}\frac{\partial rec}{\partial l_k}\frac{\partial l_k}{\partial c_k} =$$

$$\frac{\partial xerr}{\partial rec}\frac{\partial rec}{\partial c_k} + \frac{\partial xerr}{\partial rec}\frac{\partial rec}{\partial l_k} \underbrace{\left[\left(\frac{\partial img}{\partial c}\right)_{\substack{c=c_k\\S=S^t}}\right]^\tau}_{\text{image Jacobian } J(c,S) \text{ for } c_k \text{ and } S^t}$$

In an embodiment, SGD can be used to evaluate a gradient with respect to θ and $c_1, \ldots, c_K$ of the expected error:
with points of evaluation omitted for brevity and τ denoting the matrix transpose. Of all the individual terms in the above equations, only one depends on a precise model of the system and scene: the image Jacobian J(c, $S$).

The system 100 can captures an M-pixel image in response to an N-element control vector, J(c, $S$) is an N×M matrix. In this way, element [n,m] of this matrix tells the system how the intensity of image pixel m will change if element n of the control vector is adjusted by an infinitesimal amount. As such, it is related to the system's directional image derivatives by a matrix-vector product:

$$D_a img(c, S) = \frac{1}{\|a\|} a\, J(c, S)$$

Figure 17:
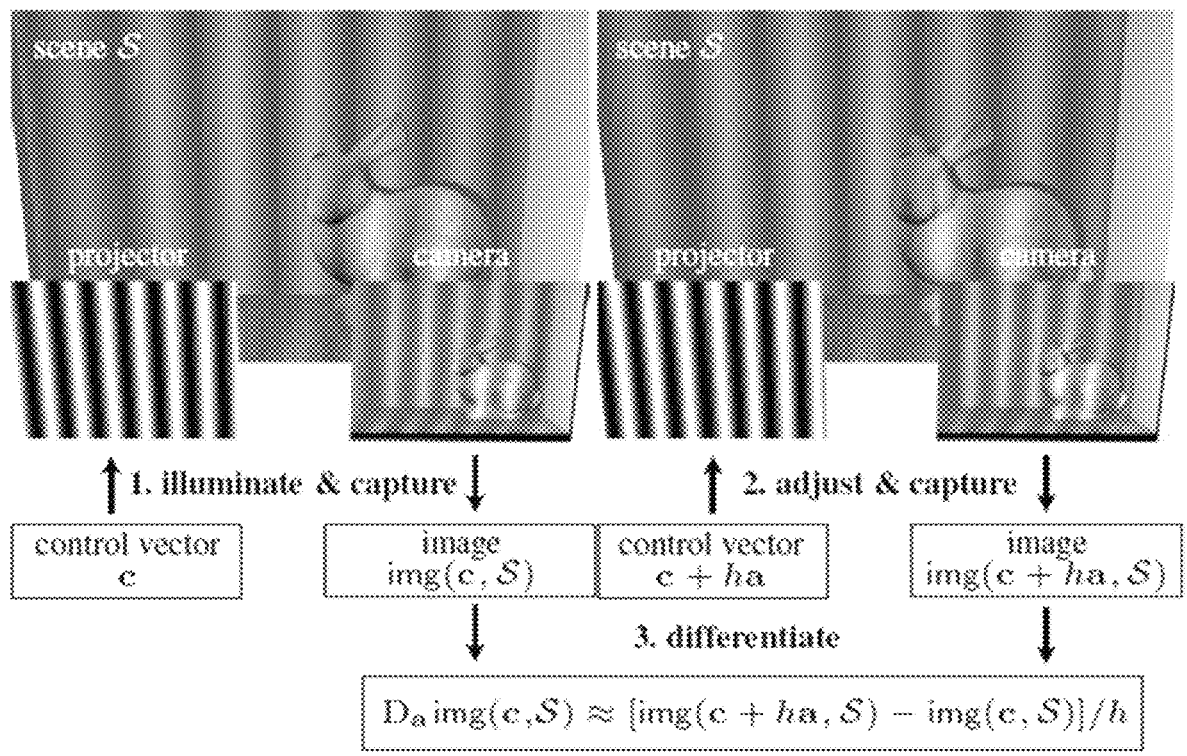
FIG. 17 illustrates an example implementation of optical auto-tuning in accordance with the system of FIG. 14.

It follows that having physical access to both a differential imaging system and a scene $S$, the system 100 can compute individual columns of the above matrix without necessarily requiring any computational model of the system or the scene. The system 100 just needs to implement a discrete version of the matrix-vector product in the optical domain, as illustrated in the example of FIG. 17 with a projector-camera system. For example, the following "optical subroutine" can be followed by the system:

---
Optical-domain computation of n-th row of J(c, S)
---
Input: control vector c, adjustment magnitude h
Output: noisy estimate of the column
step 0: position scene S in front of system
step 1: set control vector to c and capture noisy image i
Step 2: set control vector to c + ha, where a is the unit vector along dimension n, and capture new image i'
step 3: return (i' − i)/h
step 4: (optional) repeat steps 1 & 2 to get multiple samples of i and i' & return the empirical distribution of (i' − i)/h
---

The above optical subroutine makes it possible to turn numerical SGD, which depends on system and scene models, into a 'free' optical approach. In view of such approach, the system 100 can replace image-capture operations that require modeling of systems and scenes.

In other cases, other optimization approaches and/or algorithms can be used; for example, those which do not rely on derivatives (called derivative-free optimization algorithms) can be used to optimize the reconstruction error without necessarily requiring estimating the derivatives and the Jacobian. One example of such approach is Particle-Swarm-Optimization (PSO), which updates the optimization parameters in each iteration based on the history of evaluated objective functions in the previous iterations. However, this type of approach may not be as efficient in terms of convergence rate as SGD.

Practical implementations of optical-domain SGD can face a number of technical challenges, for example: (1) imaging a large set of real-world training objects is objectively hard, (2) a closed-form expression generally must be derived for a scene's expected reconstruction error in order to evaluate its gradient, the image Jacobian, and (3) is generally too large to acquire by brute force. The system 100 addresses these technical challenges as described herein; for example, by exploiting the structure of the system-optimization problem for triangulation-based systems.

Figure 29:
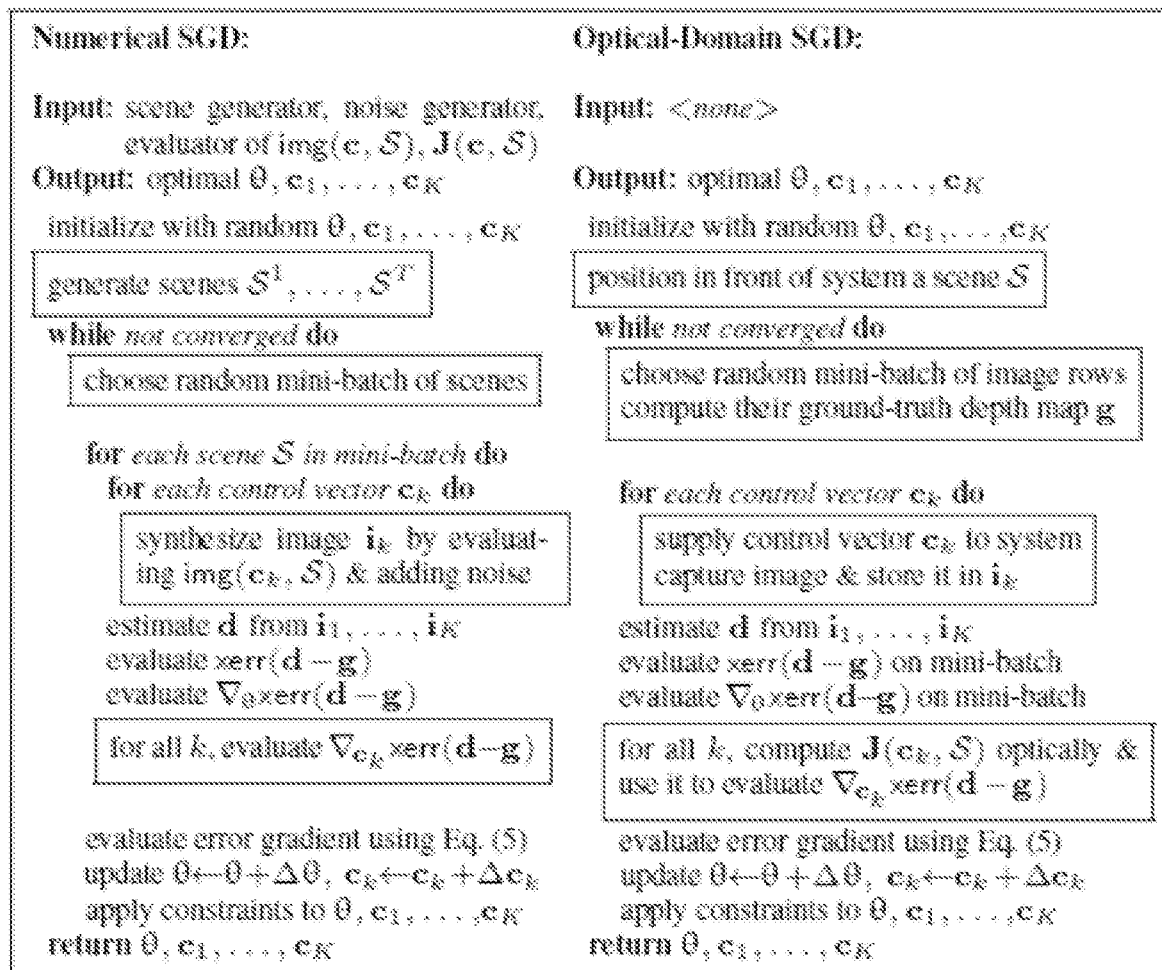
FIG. 29 illustrates an example of the numerical SGD approach and the resulting optical-domain SGD approach.

In FIG. 29, the left side outlines the steps of the numerical SGD approach and the steps of the resulting optical-domain SGD is shown on the right side; with boxes outlining their differences.

In both of the above approaches, the optimization starts with initializing the optimization parameters (namely the control vectors and reconstruction parameters). The choice of initialization parameters can have a noticeable impact on the optimization. For example, in the present embodiments, three types of initializations can be used: 1) initializing all the control vectors and reconstruction parameters with random values; 2) initializing the optimization parameters with down-scaled random values added by a constant (which results in low-contrast random values); and 3) initializing the control vectors with predetermined functions, such as those used previously or as part of the literature. Starting with pre-existing parameters can lead to a faster and better convergence. For example, in the case of structured-light 3D imaging systems (where the control vectors refer to illumination pattern), the parameters can be initialized with Sinusoidal patterns, Micro-Phase shifting patterns, Gray code, or the like. For example, in the case of Time-of-Flight 3D imaging system (where control vectors refer to modulation and demodulation signals), the initialization can be set to sinusoidal patterns, train of pulses, step function, Hamiltonian functions, or the like.

In some cases, in both numerical and optical SGD, the user can define a set of constraints for the optimized control vectors. Although these constraints can potentially refer to any user-defined functions, three specific constraints are contemplated with respect to the present embodiments: 1) the frequency content of control vectors; 2) the maximum amplitude of the control vectors; and 3) the total energy consumption caused by the control vectors. For example, in the case of structured-light 3D imaging and ToF imaging, the control vectors may refer to illumination patterns, and the systems in practice can impose constraints on the amplitude and the frequency content of the projection patterns, and their total energy consumption.

The reconstruction module 114 can address the problem of optimizing projector-camera systems for structured-light triangulation (as exemplified in FIG. 17). In this setting, $c_1, \ldots, c_K$ represent 1D patterns projected sequentially onto a scene and the reconstruction module 114 determines, independently for every camera pixel, its stereo correspondence on the projector plane. This operation can be considered equivalent to determining the pixel-to-column correspondence map d, where d [m] is the projector column that contains the stereo correspondence of camera pixel m (as exemplified in FIG. 18). The reconstruction module 114 can thus optimize the system to minimize errors in d. The pixel-to-column correspondence map generally does not require knowledge of a system's epipolar geometry, radial distortion or Euclidean calibration. As a result, optical auto-tuning can be performed by the system 100 even without this information.

In an example, suppose an object is placed in front of the image sensor 130 whose ground-truth correspondence map, g, is known. In principle, since the column correspondence of each camera pixel must be estimated independently of all others, each pixel can be thought of as a separate instance of the reconstruction task. To reduce correlations between these instances, the reconstruction module 114 can use a randomly-textured surface for training. This allows the reconstruction module 114 to treat each camera row as a different "training scene" of randomly-textured points (an example is shown in FIG. 19A).

Figure 19A:
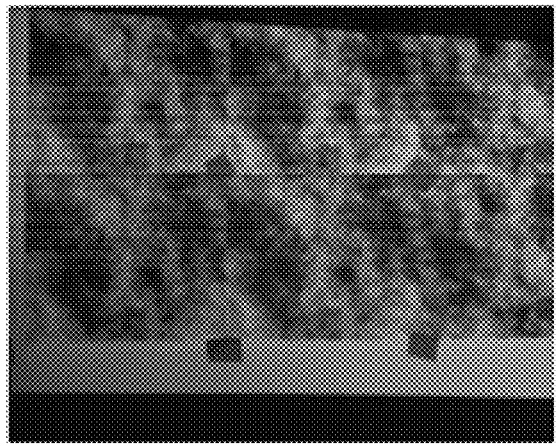
FIGS. 19A and 19B show examples of training scenes used for optimizing grayscale and RGB structured-light systems.
Figure 19B:
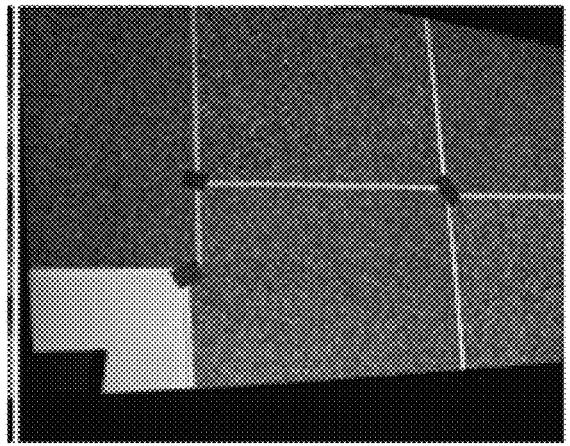
Figure 19C:
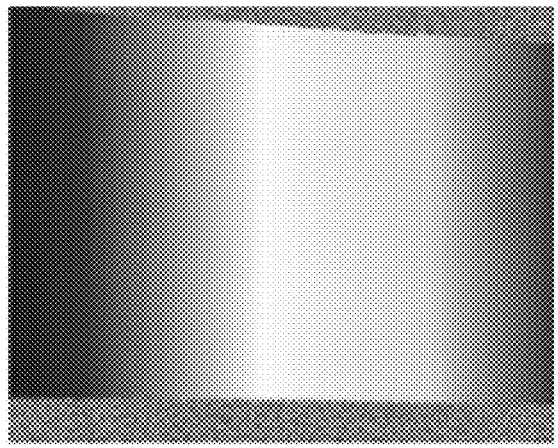
FIGS. 19C and 19D show ground-truth correspondence maps for FIGS. 19A and 19B respectively.
Figure 19D:
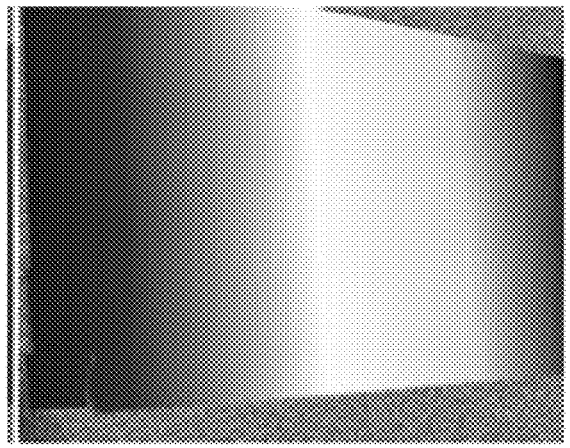

In an experiment conducted by the present inventors, FIGS. 19A and 19B examples of training scenes used for optimizing grayscale (FIG. 19A) and RGB (FIG. 9B) structured-light systems, as viewed from their respective cameras. A randomly-chosen subset of 150 rows defines a mini-batch of optical SGD (horizontal lines in FIG. 19A). Generally, these scenes should not be thought of as traditional "calibration objects" as they are neither perfectly planar nor perfectly uniform, and accurate prior knowledge of their geometry and a is not necessary. FIGS. 19C and 19D show ground-truth correspondence maps for FIGS. 19A and 19B respectively, re-computed online every 50 SGD iterations using an independent approach of much higher accuracy.

Figure 23:
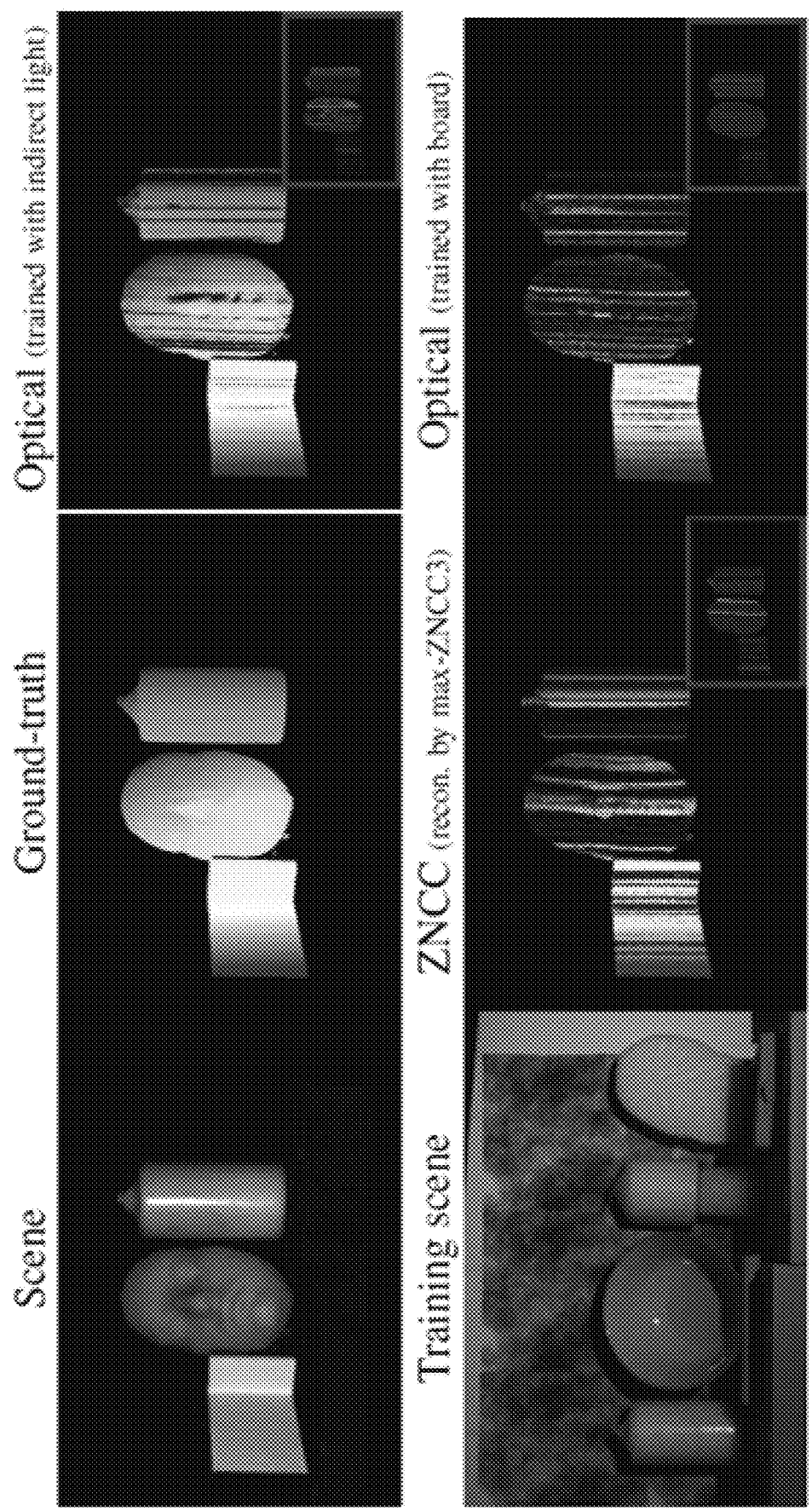
FIG. 23 illustrates an example of disparity maps showing tuning patterns with indirect light to boost performance of reconstruction.

In a similar approach, a different randomly-textured surface which exhibits subsurface scattering, surface inter-reflection or other forms of indirect light can be used as a training scene. Such a training scene can lead the optical auto tuning framework to particularly optimize the patterns for reconstructing scenes with indirect light. In an experiment conducted by the present inventors, FIG. 23 shows an example of a training scene exhibiting indirect light. The results shown in FIG. 23 illustrate that training on a scene with indirect light can boost the performance of the optimized patterns for reconstructing other scenes with indirect light.

Figure 20:
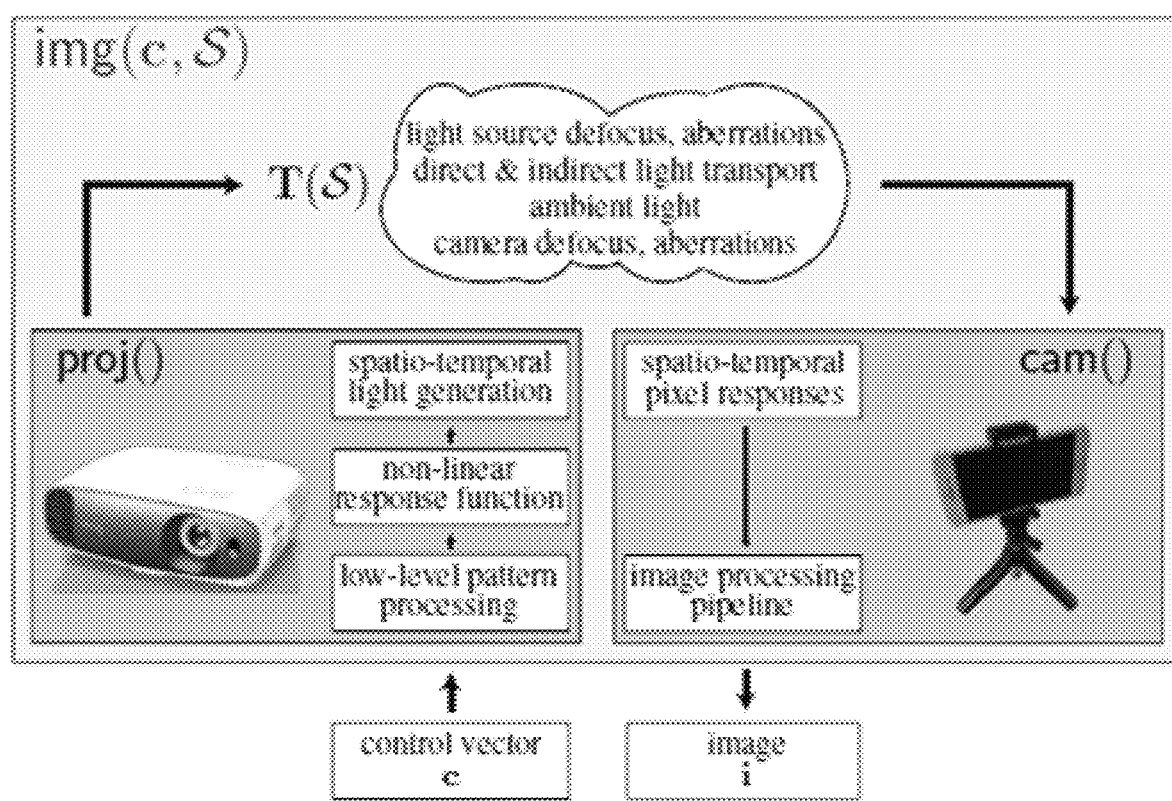
FIG. 20 shows an example of image formation in general projector-camera systems.

In an embodiment, the system 100 can treat the projector 140 and image sensor 130 as two non-linear "black-box" functions proj( ) and cam( ), respectively. These account for device non-linearities as well as internal low-level processing of patterns and images (for example, non-linear contrast enhancement, color processing, demosaicing, denoising, or the like). An example of image formation in general projector-camera systems is illustrated in FIG. 20. The projector function proj( ) maps a control vector of digital numbers to a vector of outgoing radiance values. Similarly, the camera function cam( ) maps a vector of sensor irradiance values to a vector holding the processed image. Advantageously, optical-domain SGD enables end-to-end optimization without knowing either function.

Between the projector 140 and image sensor 130, light propagation is linear and can thus be modeled by a transport matrix T($\mathcal{S}$). In some cases, this matrix is unknown and generally depends on the scene's shape and material properties, as well as the system's optics. It follows that the image and its Jacobian are given by $$i = \underbrace{cam(proj(c)T(\mathcal{S}) + ambient)}_{img(c,\mathcal{S})} + noise$$

$$J(c, \mathcal{S}) = \underbrace{\frac{\partial proj}{\partial c}}_{\text{projector non-linearities } (N \times N)} \underbrace{T(\mathcal{S})}_{\text{optics,3D shape,reflectance, } (N \times M)} \underbrace{\frac{\partial cam}{\partial irr}}_{\text{camera non-linearities } (M \times M)}$$

where noise may include a signal-dependent component and irr denotes the vector of irradiances incident on the image sensor's 130 pixels. Thus, the system 100 can use optical auto-tuning in the absence of indirect light will force it to account for its inherent non-linearities, optical imperfections, and noise properties.

In an embodiment, for linear systems and low signal-independent noise, correspondence can be determined to be optimal in a maximum-likelihood sense by: (1) treating the intensities $i_1[m], \ldots, i_K[m]$ observed at pixel m as a K-dimensional "feature vector," (2) comparing it to the vector of intensities at each projector column, and (3) choosing the column that is most similar according to the zero-mean normalized cross-correlation (ZNCC) score:

$$z_m[n] \stackrel{\text{def}}{=} ZNCC([i_1[m], \ldots, i_K[m]], [c_1[n], \ldots, c_K[n]])$$

$$d[m] = \arg\max_{1 \leq n \leq N} z_m[n]$$

where for two vectors $v_1$, $v_2$, their ZNCC score is the normalized cross correlation of $v_1$−mean($v_1$) and $v_2$−mean($v_2$).

The reconstruction module 114 can generalize the above approach in three ways. First, by expanding feature vectors to include their 3×1 neighborhood, i.e., the intensities $i_k[m-1], i_k[m+1]$ in each image and $c_k[n-1], c_k[n+1]$ in each pattern. This makes it possible to exploit intensity correlation's that may exist in tiny image-neighborhoods:

(ZNCC3 similarity) $z_m[n] = ZNCC(f_m, f_n)$ where $f_m, f_n$ are vectors collecting these intensities. Second, the reconstruction module 114 can model the projector's response curve as an unknown monotonic, scalar function g( ) consisting of a predetermined number of linear segments; for example, 32 segments. This introduces a learnable component to the reconstruction function, whose 32-dimensional parameter vector can be optimized by optical SGD along with $c_1, \ldots, c_K$. Third, the reconstruction module 114 can add a second learnable component to better exploit neighborhood correlations, and to account for noise and system non-linearities that cannot be captured by the scalar response g( ) alone. In an embodiment, this learnable component can comprise two residual neural network (ResNet) blocks for the camera and projector, respectively; however, any suitable machine learning paradigm can be used.

(ZNCC3-NNsimilarity) $z_m[n] = ZNCC(f_m + \mathcal{F}(f_m), g(f_n) + \tilde{\mathcal{F}}(g(f_n)))$ where $\mathcal{F}( )$ and $\tilde{\mathcal{F}}( )$ are neural nets with two fully-connected layers of dimension 3K×3K and a rectified linear unit (ReLU) in between. Thus, in this embodiment, the total number of learnable parameters in the reconstruction function, and thus in vector, is $36K^2+32$.

For linear projector-camera systems and low signal-independent noise, a tight approximation to the expected error of a row can be obtained from the ZNCC score vectors of its pixels:

$$xerr(d - g) \approx \frac{1}{M}\sum_{m=1}^{M} \text{softmax}(\tau z_m) \cdot err(\text{index} - g[m])$$

where · denotes dot product; τ is the softmax temperature; $z_m$ is given above; index is a vector whose i-th element is equal to its index i; and err( ) is defined herein. Strictly speaking, this approximation to the row-specific expected error may not apply to ZNCC3 and ZNCC3-NN similarities or general non-linear systems. Nevertheless, the present inventors use it in the optical SGD objective as it was found it to be very effective in practice.

Although the image Jacobian in the present embodiments can very large, it is also generally very sparse. This makes it possible to acquire several rows of the Jacobian "in parallel" from just one invocation of the optical-domain subroutine. In particular, an adjustment vector with N/L equally-spaced non-zero elements will produce an image whose pixels will be the sum of N/L rows of the Jacobian. It follows that if L is large enough to avoid overlap between the non-zero elements in these rows, the rows can be recovered exactly.

In an embodiment, to generate more distinct sets of correspondences for optical auto-tuning, the reconstruction module 114 can circularly shift the patterns by random number of pixels every few iterations. Shifting the patterns effectively leads to training on a different batch of scenes, and can provide a more accurate approximation for the SGD error. Moreover, with circular shift, the captured images during the optimization do not require to cover the whole field of view of the projector. Thus, it can help speed up the optimization, by looking at smaller region of camera image.

Although the optimized patterns generalize well to other imaging conditions, the system 100 can optimize the system under the specific desired imaging scenario to get the best performance. One noteworthy example is low-SNR regime (due to presence of severe noise, limited irradiance on scene, and the like). However, the Jacobian computed in such a scene may be dominated by noise, and therefore prevents the auto-tuning of the system directly in very low light scenes.

While minor noise can help optimization be more robust, it may be very hard to learn with extreme noise. In such cases, a data augmentation can be used to synthetically generate less-noisier scene samples in low light conditions to use for training. In this way, not only is the captured image (consisting of multiple rows) used for evaluating the update in each iteration, but also the down-scaled (i.e. darker) version of the image. This approach can also be seen as synthetically introducing more varying scenes to the optimization. The present inventors' example experiments indicate that this approach has a noticeable impact on the generalization of the optimized patterns to low-SNR conditions.

Many structured-light techniques, require to choose a specific frequency as its building block. For instance, ZNCC-optimized patterns generally rely on an upper bound for its frequency content, or multiple phase shifting (MPS) generally needs the user to select the main frequency of its constructing sinusoidal patterns. Choosing the frequency for these techniques can have tremendous effect on their performances. The selection of optimal frequency depends on the scene and the imaging system and can be a tedious task. However, advantageously, the present embodiments do not require frequency input from a user. In this way, the patterns can automatically update their frequency content in response to the specific characteristics of the system.

In an example case, the SGD optimizer can use RMSprop neural network optimizer and select Tensorflow as the framework. The patterns can be initialized with a constant matrix added by small uniform noise. The learning rate can be set to, for example, 0.001, and have it decay to half every, for example, 500 iterations. A step-size of, for example, $L=7$ for training on board and $L=23$ for training on objects with indirect light. The present inventors have noticed that the Jacobian changes very slightly in two subsequent iterations. Therefore, to speed up the optimization, in some cases, the Jacobian can be estimated each, for example, 15 iterations, and use the same Jacobian to evaluate the overall gradients in that span. In some cases, a random circular shift can be applied to patterns every 15 iterations. In the example case, a number of camera rows for auto-tuning the system can be empirically set to 15% of the total number of rows. Since the scene can be sensitive to small vibrations, the system 100 can capture the ground-truth every 50 iterations to ensure its robustness, by projecting, for example, 30 ZNCC-optimized patterns. We validated our choice of ground-truth measurement by comparing it with projecting 160 conventional phase-shifted patterns. In the example experiment, for all the scenes with limited amount of indirect light (including the training board), exact correspondence matches can exceed 97% of the pixels and the remaining 3% are one pixel away. In this experiment, it was found that the optimization takes less than an hour for auto-tuning 4 patterns with standard consumer-level projectors and cameras, and converges in less than 1000 iterations.

In an example, the present inventors measured performance of optically-optimized sequence of patterns, and their generalization to different imaging conditions. In this example experiment, the optical auto-tuning framework, described herein, for generating the optimized sequence of grey-scale patterns, for a particular 3D imaging system, consisting of a non-linear consumer-level projector (LG-PH550) and a linear camera (IDS-UI3240CP). All the patterns were optimized with a textured board as the training object (as exemplified on the left side of FIG. 20).

Figure 21:
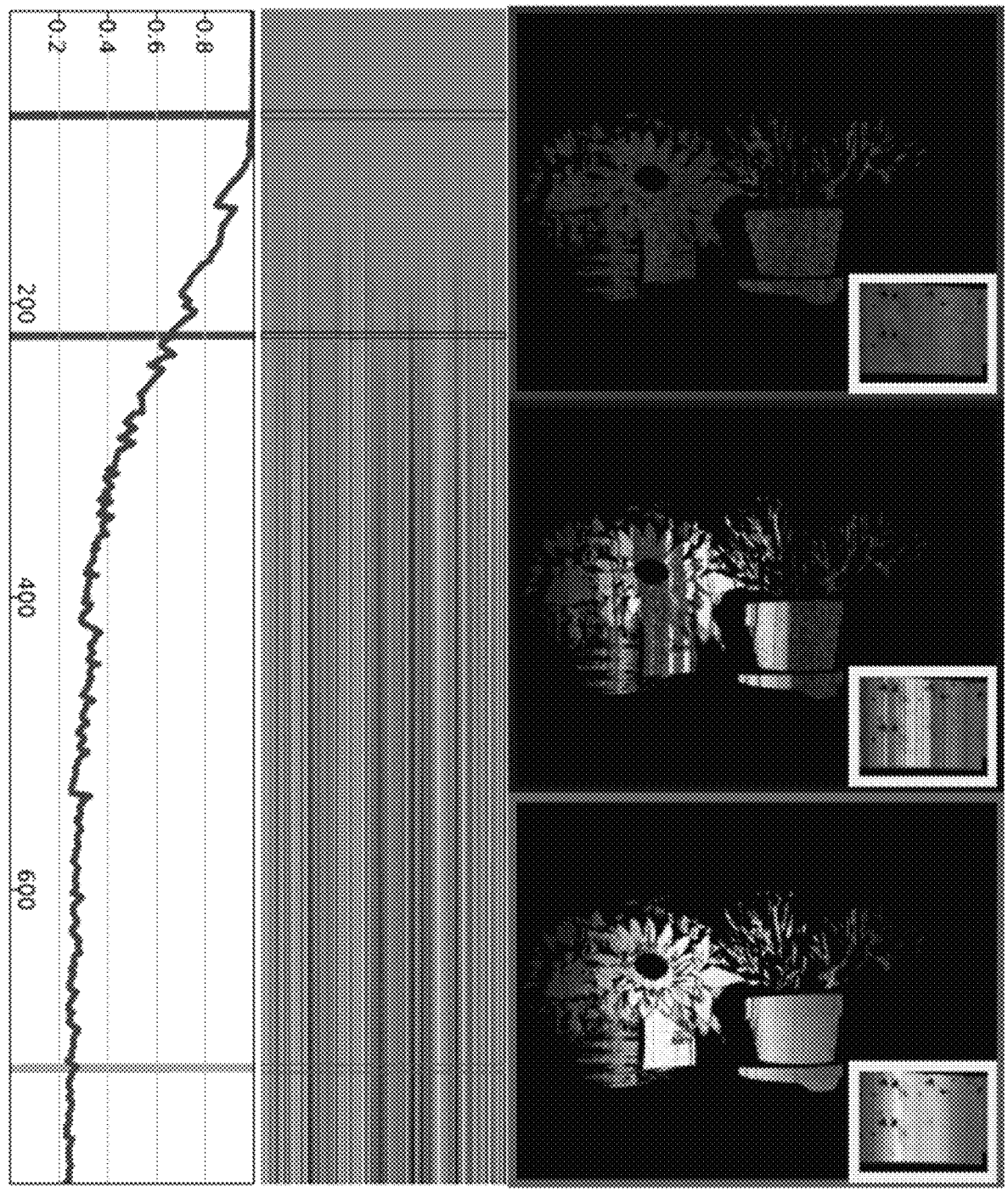
FIG. 21 illustrates an example experiment showing how a sequence of 4 patterns evolves through auto-tuning with max-ZNCC3-NN as the reconstruction function, and $\varepsilon$-precision with $\varepsilon=0$ as the error function.

FIG. 21 depicts an example experiment showing how a sequence of 4 patterns evolves through auto-tuning with max-ZNCC3-NN as the reconstruction function, and $\varepsilon$-precision with $\varepsilon=0$ as the error function. Although, in this example experiment, the patterns were optimized on the training board, it generalizes well to the sample test scene, which has wide range of albedos, materials, and orientations. As the iterations go forward, the patterns automatically tune themselves to output a closer disparity map to the ground truth for the training board, and the same trend applies to the test scene.

Figure 16:
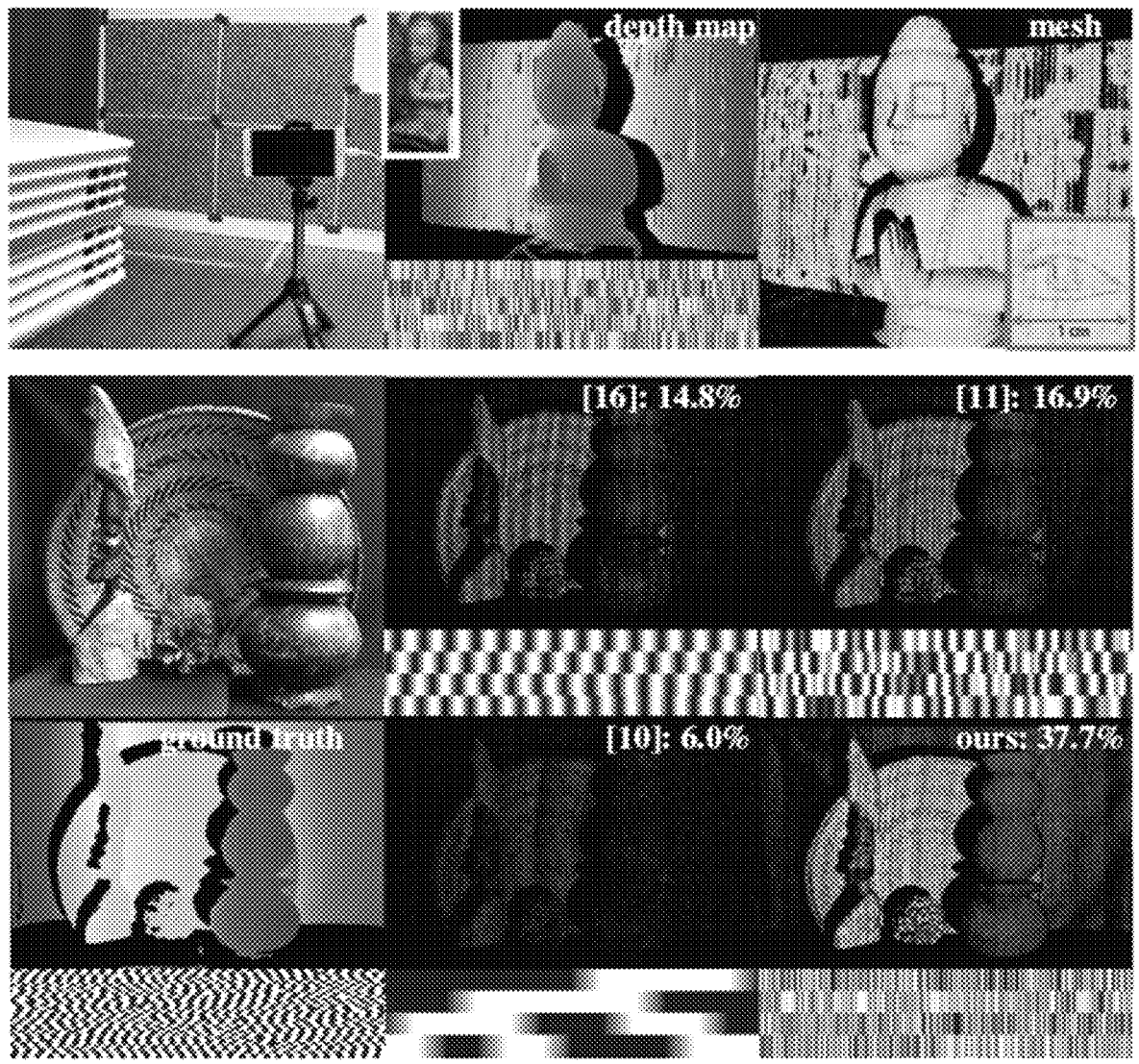
FIG. 16 shows setup and experimental results for an example experiment of structured light in accordance with the system of FIG. 14.

TABLE 2 demonstrates a full quantitative comparison with other encoding schemes (K=4) for the scene shown in FIG. 16 (bottom row) but under different exposure. For each patterns' sequence, the example experiment evaluated the performance under different reconstruction functions, and show the percentage of pixels which their correspondences are exactly correct. The results suggest that optical auto-tuned patterns with max-ZNCC3-NN can outperform other encoding schemes, even with enhanced reconstruction functions which are not their native decoders. Furthermore, considering the scene's broad range of albedos and orientations, the results demonstrate that training on a board is sufficient to be generalizable to other scenes.

TABLE 2

| Enc. | Recon. | | |
|---|---|---|---|
| | ZNCC | ZNCC3 | ZNCC3-NN |
| MPS | 13.70% | 25.95% | 26.80% |
| ZNCC | 18.69% | 38.54% | 37.98% |
| Hamiltonian | 5.39% | 7.96% | 8.18% |
| Optical | 8.27% | 45.75% | 46.84% |

TABLE 2 illustrates MPS and ZNCC where the best maximum frequencies (16 and 32 respectively) were selected. For max-ZNCC3-NN, the neural network was trained for each pattern individually. Since the projector is non-linear, to evaluate other techniques, the system 100 was linearized through calibration. In some cases, the optical patterns run on native system without any calibration nor any specification for its frequency content.

Figure 22:
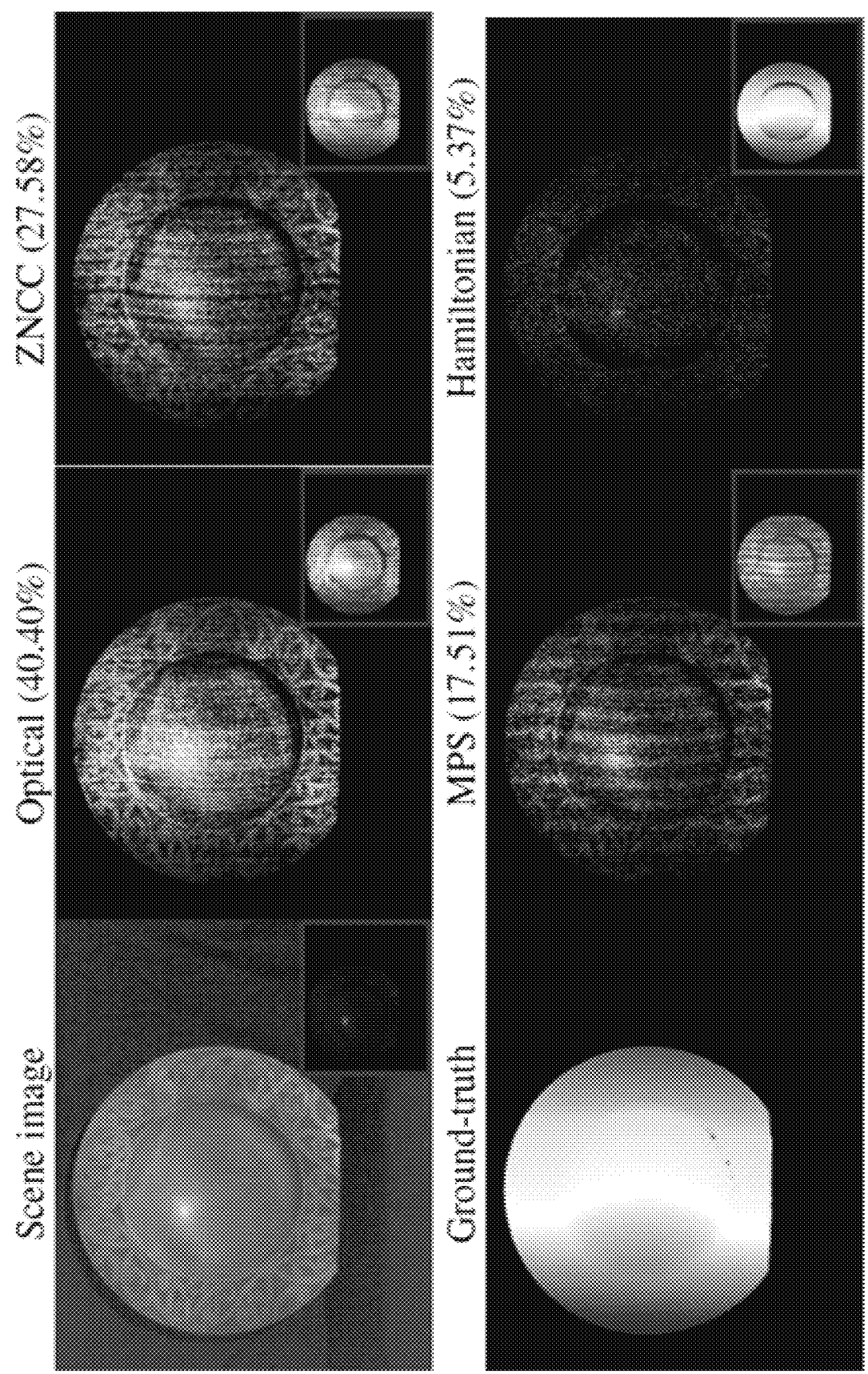
FIG. 22 shows the reconstruction results of the same auto-tuned sequence of 4 patterns against other encoding methods.

FIG. 22 shows the reconstruction results of the same auto-tuned sequence of 4 patterns (shown in FIG. 21 and high-lighted in TABLE 2) against other encoding methods, reconstructed by max-ZNCC3. The camera aperture is particularly set in a way to show the performance of different methods in low-SNR regime. The disparity maps are filtered to only show the pixels whose estimated disparities are exactly the same as ground-truth. The ground-truth is acquired by projecting 160 high-frequency phase-shifted cosine patterns. It was determined that optically-optimized patterns, of the present embodiments, outperform other encoding methods (which are also boosted by max-ZNCC3 reconstruction function). The results indicate the general optical auto-tuned patterns not only can be generalized to other geometries and materials, but also perform well in low-SNR condition.

FIG. 22 illustrates an example of disparity maps are acquired by projecting 4 patterns onto a very dark scene. The middle and right column shows the filtered (main image) and raw (overlaid) disparity maps. To better show the scene image, the raw camera image is brightened up by applying gamma function (the raw image is overlaid with the scene image). To reconstruct other techniques, max-ZNCC3 was used, but the patterns of the present embodiments were optimized for max-ZNCC3-NN. The percentages of pixels with correct disparities are shown above each disparity map.

In the example experiments, the general optical auto-tuned patterns were found to perform well with a wide variety of objects and imaging conditions (for example, different shapes and materials, low-SNR conditions, and the like). In some cases, if there exists any prior knowledge about the system, objects or imaging conditions, the system 100 can tune the patterns for the desired setup. For instance, optical auto-tuning can be performed on an object with indirect light, to specifically optimize the system for reconstructing other scenes with indirect light. FIG. 23 is an example comparing the performances of optical auto-tuned patterns (K=4, optimized with $\varepsilon$=3, reconstructed by max-ZNCC3-NN) trained with and without indirect light. In this example, the patterns specifically optimized with indirect light show a noticeable accuracy gain in reconstructing the scenes with similar behaviour.

FIG. 23 illustrates an example of disparity maps showing tuning the patterns with indirect light can boost the performance in reconstructing other scenes which exhibit similar amount of indirect light. To better visualize the disparity maps' accuracies, for each one, its error map against the ground-truth is also overlaid.

Figure 24:
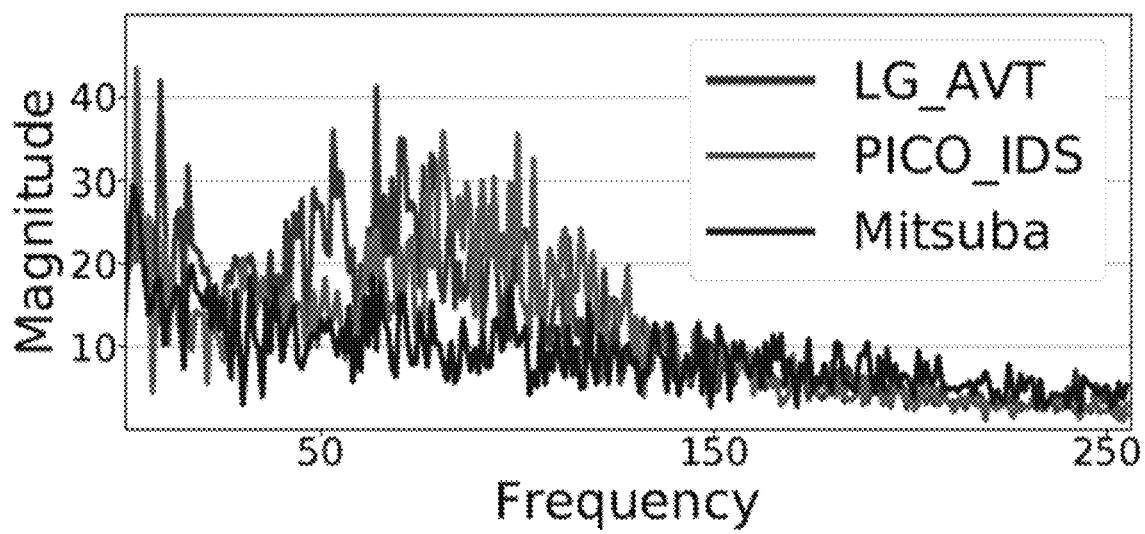
FIG. 24 illustrates, in an example experiment, optimized patterns on three different systems and a graph of a mean magnitude of frequency content (DFT) for different optical auto-tuned patterns.

As another example experiment, FIG. 24 investigates how an optically-tuned pattern with a particular imaging system, according to the present embodiments, behaves on other systems. In these example experiments, the experiments were performed with two different camera-projector pairs, and also a computational light transport renderer, called Mitsuba-CL to simulate the structured-light triangulation. All the pattern sequences are optimized for $\varepsilon$=0 with max-ZNCC3-NN as the reconstruction function and K=4. The quantitative results and also the frequency content of the optimized patterns show the tuned patterns were specifically optimized for the training system. These patterns were tuned differently in response to the specific characteristics of the system they were trained on.

The top of FIG. 24 illustrates, in the example experiment, optimized pattern on three different systems and tested on other systems. The projector-camera pairs are LG(PH550)-AVT(1920) and PICO-IDS(3240), and the renderer is Mitsuba-CLT. The training object for all the systems is a board with random texture, and tested on a sample scene. The numbers show the percentage of pixels with exact correct disparities. The bottom of FIG. 24 illustrates, in the example experiment, the mean magnitude of frequency content (DFT) for different optical auto-tuned patterns exhibit very distinct behaviours.

Figure 26:
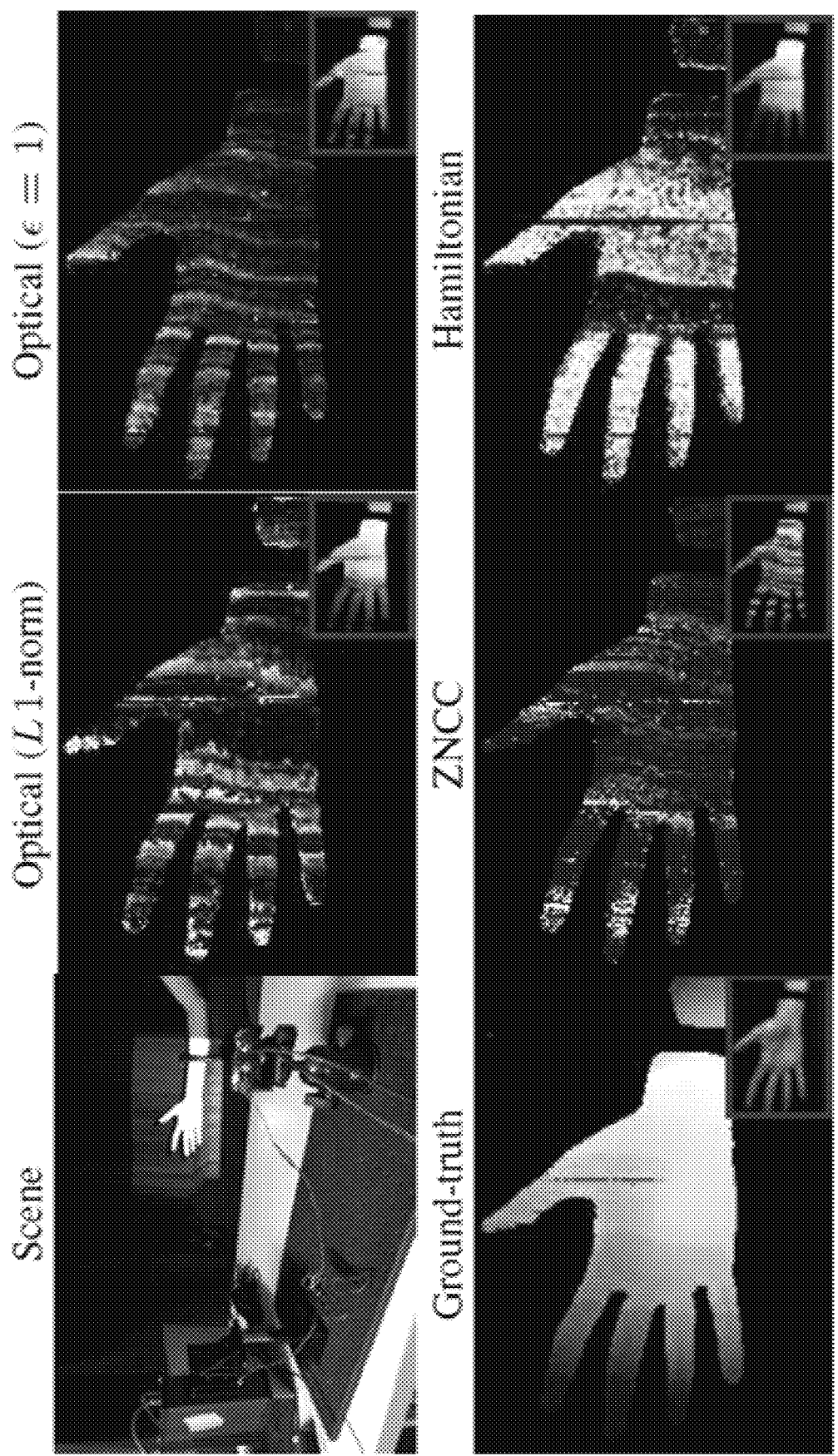
FIG. 26 illustrates, for the example experiment, optical auto-tuning framework used to optimize two sequences of patterns.

To explore the capability of the optical auto-tune framework of the present embodiments, the optimization approach was applied to totally different systems. First, as shown in FIG. 16, color-patterns were optimized (K=5, $\varepsilon$=1, max-ZNCC3-NN) for active triangulation using a projector and cell phone. Second, the same approach was applied to a renderer to assess the applicability of such an approach in a simulation environment (which has different noise distribution due to limited number of rendering samples) and also investigate the generalization of the auto-tuned patterns over a data set. Example reconstruction of a shape model under different encodings are shown in FIG. 25. It also demonstrates training on a board can be generalizes well to a wide range of shapes. Third, the present inventors optimized 4 projection patterns for a single-shot 3D imaging system based on a 2-Bucket Camera (a per-pixel coded-imaging camera). FIG. 26 compares examples of the performance of the auto-tuned patterns, in the present embodiments, (optimized with L1-norm and $\varepsilon$=1) against Hamiltonian encoding.

FIG. 25 illustrates, for the example experiment, evolution of training accuracy and validation accuracy over 30 different shape models (red) throughout the optimization for tuning a sequence of patterns (with K=4, $\varepsilon$=0, and max-ZNCC3-NN as the reconstruction function). The shape models were chosen from six different classes of a publicly available dataset, called ModelNet. Dashed lines show the performance of other encoding schemes over the same dataset. As the results suggest, optical auto-tuning using a simple object like board, according to the present embodiments, does not appear to cause any overfitting.

FIG. 26 illustrates, for the example experiment, optical auto-tuning framework used to optimize two sequences of patterns (K=4, max-ZNCC3-NN), one with L1-norm and the other with $\varepsilon$=1. The results are also compared with ZNCC and Hamiltonian encoding schemes. The main images are the error maps of disparities against the ground-truth, and the overlaid images are raw disparity maps.

The optical auto-tuning framework of the present embodiments provides an approach for, at least, learning optimal illumination patterns for active 3D triangulation. The patterns, although may be learnt on a specific object, are shown to be generalizable to a wide variety of shapes, materials, and imaging conditions. In this way, the optical auto-tuning framework can not only can be very effective in optimizing the structured light systems, but also can be applied to other inverse problems in computational imaging where the image formation model may not be obvious.

Figure 27B:
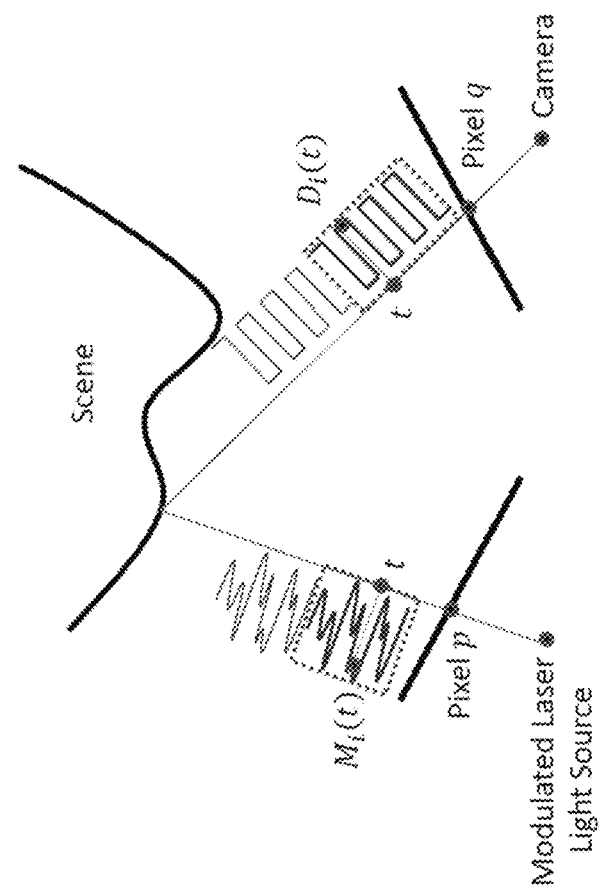
FIG. 27B is an example diagram of continuous-wave time-of-flight depth imaging.
Figure 27A:
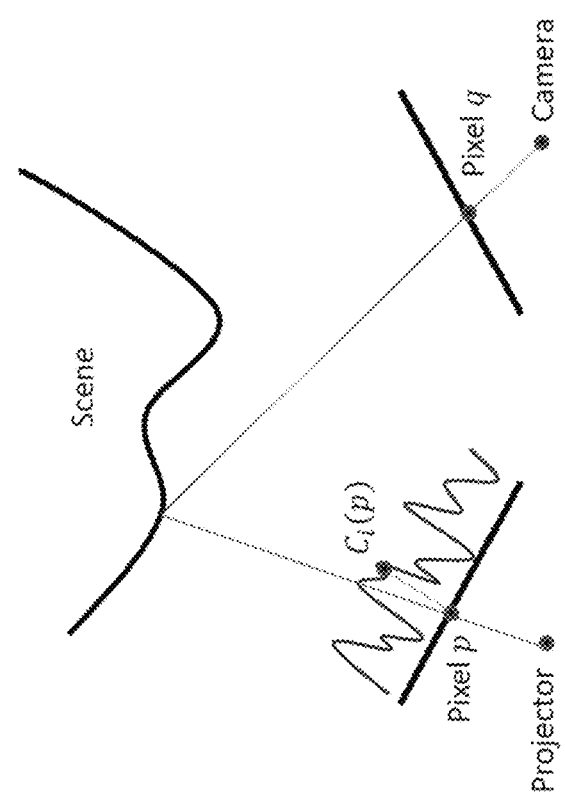
FIG. 27A is an example diagram of structured-light triangulation depth imaging.

In another embodiment, the reconstruction and/or optimization approaches described herein can be used for Time-of-Flight 3D imaging. In a particular case, using Continuous-Wave Time-of-Flight (C-ToF) cameras can present a different approach for 3D imaging, where a projector 140 comprising a modulating light source (for example, a modulated laser light source) emits multiple periodic light signals (called modulation signal) to the scene. In this case, the modulation signal defines a time-varying illumination pattern for illuminating the scene. The image sensor 130 captures the received light during a full cycle with a corresponding exposure profile (called demodulation signal) for each emitted signal. The reconstruction module 114 can estimate a scene depth at each pixel using observations captured by the capture module 109 for each pair of modulation and demodulation functions. In an example illustrated in FIG. 27A, for structured light triangulation, the coding generally occurs in the spatial domain over the projector pixels, and the depth at each camera pixel is estimated by determining a corresponding projector pixel. In contrast, as illustrated in the example of FIG. 27B, for ToF imaging, the coding generally occurs in the temporal domain. In this case, the modulation function to be emitted by the light source pixels and the demodulation function that controls the exposure for the image sensor pixels.

In a particular case, to formulate the image formation model, without loss of generality, it can be assumed that the projector and image sensor are collocated. The image formation model for C-ToF imaging system can be formulated as:

$$o_q = b_q \cdot F(d(q)) + a_q + e_q$$

where $o_q$ denotes the vector of observation at pixel q, $b_q$ refers to the albedo at pixel q, $a_q$ is the ambient lights for pixel q in the captured images, and $e_q$ is the vector of noise in the observations. Furthermore, d(q) specifies the depth at pixel q. F(d(q)) denotes the vector consisting of the cross-correlation between the shifted modulation signal (corresponding to depth d) and the demodulation function for each pair of signals:

$$F_i(d) = \int D_i(t) M_i\left(t - \frac{2d}{c}\right) dt$$

where $F_i(d)$ denotes the i-th element of vector $F(d(q))$; $D_i(t)$ and $M_i(t)$ denote the i-th pair of demodulation and modulation functions respectively; and c refers to the speed of light. The above formulation treats the F(d) as the code-vector corresponding the depth d.

In a similar manner to structured-light triangulation, as described herein, the system 100 can achieve optimal performance for estimating the depth using the captured images corresponding to each pair of modulation-demodulation signal by determining optimal modulation and demodulation functions for achieving the best performance in depth estimation.

In an embodiment, the system 100 can convert the ToF decoding problem to a discrete problem by discretizing the range of depths, and determine the depth bin which contains the actual scene's depth. Then the decoding can determine the depth as described herein for structured light triangulation: given a set of observations and the cross-correlation code-vectors at each depth bin, determine which depth bin maximizes a likelihood function. The ZNCC decoder described herein can be used to determine an optimization for detecting the corresponding code-vector and consequentially to estimate the depth for each pixel. More specifically the depth can be estimated as $$d^* = \underset{\substack{d_i \\ 1 \leq i \leq N}}{\operatorname{argmax}} \ ZNCC(o_q, F(d_i))$$

where that p is the index of each bin, and $d_i$ refers to the center of i-th bin of depth, and N is the number of depth bins which specifies the level of discretization.

In a similar manner to structured-light triangulation, as described herein, the optical domain SGD and numerical SGD presented at TABLE 1 can be used for optimizing the control vectors refer to each pair of discretized modulation and demodulation signal (as shown in FIG. 27B).

Figure 28:
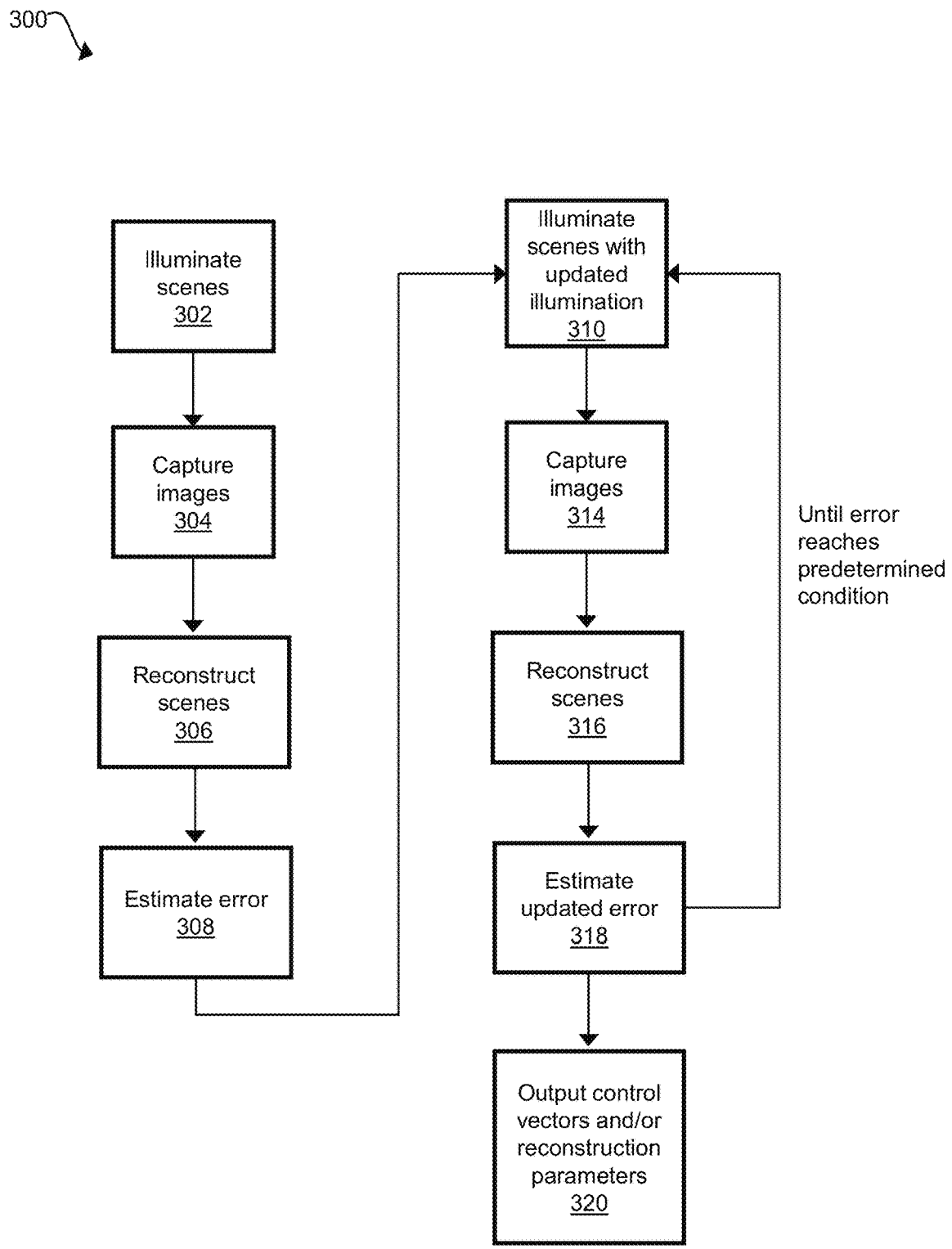
FIG. 28 is a flow diagram of a method for optimizing depth imaging, in accordance with another embodiment.

FIG. 28 shows a method 300 for optimizing depth imaging of a scene, in accordance with an embodiment, using the approaches described herein. At block 302, the illumination module 108 illuminates one or more scenes with illumination patterns governed by an initial set of control vectors. At block 304, the capture module 109 captures one or more images of each of the scenes while the scene is being illuminated with at least one of the illumination patterns. At block 308, the reconstruction module 114 reconstructs the scenes from the captured images with reconstruction parameters. At block 308, the reconstruction module 114 estimates the reconstruction error and a gradient of the reconstruction error with respect to the control vectors and the reconstruction parameters. Blocks 310 to 318 are iteratively performed until the reconstruction error reaches a predetermined error condition. At block 310, the reconstruction module 114 determines a current set of control vectors and current set of reconstruction parameters by updating at least one of the set of control vectors and the set of reconstruction parameters to reduce the reconstruction error. At block 312, the illumination module 108 illuminates the one or more scenes with the illumination patterns governed by the current set of control vectors. At block 314, the capture module 109 captures one or more images of each of the scenes while the scene is being illuminated with at least one of the illumination patterns. At block 318, the reconstruction module 114 reconstructs the scenes from the one or more captured images using the current reconstruction parameter. At block 318, the reconstruction module 114 estimates an updated reconstruction error and an updated gradient of the reconstruction error with respect to the current control vectors and the current reconstruction parameters. At block 320, the output interface 108 outputs at least one of the current control vectors and the current reconstruction parameters.

While embodiments of the present disclosure describe optimization of control vectors and projection patterns, it is understood the optimization techniques can be applicable to other suitable applications; for example, optimizing energy usage.

Although the invention has been described with reference to certain specific embodiments, various modifications thereof will be apparent to those skilled in the art without departing from the spirit and scope of the invention as outlined in the claims appended hereto. The entire disclosures of all references recited above are incorporated herein by reference.

The invention claimed is:

1. A computer-implemented method for optimizing depth imaging, the method comprising:
   illuminating one or more scenes with illumination patterns governed by an initial set of control vectors;
   capturing one or more images of each of the scenes while the scene is being illuminated with at least one of the illumination patterns;
   reconstructing the scenes from the captured images with reconstruction parameters;
   estimating the reconstruction error and a gradient of the reconstruction error with respect to the control vectors and the reconstruction parameters;
   iteratively performing until the reconstruction error reaches a predetermined error condition:
      determining a current set of control vectors and current set of reconstruction parameters by updating at least one of the set of control vectors and the set of reconstruction parameters to reduce the reconstruction error;
      illuminating the one or more scenes with the illumination patterns governed by the current set of control vectors;
      capturing one or more images of each of the scenes while the scene is being illuminated with at least one of the illumination patterns;
      reconstructing the scenes from the one or more captured images using the current reconstruction parameters; and
      estimating an updated reconstruction error and an updated gradient of the reconstruction error with respect to the current control vectors and the current reconstruction parameters; and
   outputting at least one of the current control vectors and the current reconstruction parameters.

2. The method of claim 1, wherein estimating the reconstruction error comprises evaluating a function that penalizes depth errors with respect to a ground truth, and wherein iteratively reducing the reconstruction error comprises performing at least one of stochastic gradient descent and derivative-free optimization.

3. The method of claim 1, wherein the initial control vectors comprise at least one of pre-existing control vectors, random control vectors, or low-contrast random control vectors.

4. The method of claim 1, wherein updating the set of control vectors also comprises incorporating user-defined constraints comprising at least one of frequency content of the illumination patterns, amplitude of the illumination patterns, and total energy consumption of the illumination patterns.

5. The method of claim 1, wherein the one or more scenes are computationally generated and restricted to lie in a selected subset of 3D space, wherein illuminating the one or more scenes with the illumination pattern comprises a computational simulation, wherein capturing the one or more images comprises computationally simulating image formation, and wherein estimating the gradient of the reconstruction error comprises determining a derivative based on an image formation model.

6. The method of claim 1, wherein the one or more scenes comprise at least one surface, illuminating the one or more scenes with the illumination patterns comprises optical illumination, capturing the one or more images comprises optically capturing the one or more images, and estimating the gradient of the reconstruction error comprises optically estimating an image Jacobian with respect to the control vectors.

7. The method of claim 6, wherein the one or more scenes comprise a randomly-textured surface that exhibits at least one of direct surface reflection, sub-surface scattering, or surface inter-reflection.

8. The method of claim 1, wherein the control vectors comprise at least one of a discretized time-varying illumination pattern and a discretized time-varying pixel demodulation function.

9. A system for optimizing depth imaging, the system comprising one or more processors in communication with a data storage, the one or more processors configurable to execute:
   an illumination module to direct illumination of one or more scenes with illumination patterns governed by an initial set of control vectors;
   a capture module to receive one or more captured images of each of the scenes while the scene is being illuminated with at least one of the illumination patterns;
   a reconstruction module to:
      reconstruct the scenes from the captured images with reconstruction parameters;
      estimate the reconstruction error and a gradient of the reconstruction error with respect to the control vectors and the reconstruction parameters; and
      iteratively perform until the reconstruction error reaches a predetermined error condition:
         determining a current set of control vectors and current set of reconstruction parameters by updating at least one of the set of control vectors and the set of reconstruction parameters to reduce the reconstruction error;
         illuminating the one or more scenes with the illumination patterns governed by the current set of control vectors;
         capturing one or more images of each of the scenes while the scene is being illuminated with at least one of the illumination patterns;
         reconstructing the scenes from the one or more captured images using the current reconstruction parameters; and
         estimating an updated reconstruction error and an updated gradient of the reconstruction error with respect to the current control vectors and the current reconstruction parameters; and
   an output interface to output at least one of the updated control vectors and the updated reconstruction parameters.

10. The system of claim 9, wherein estimating the reconstruction error comprises evaluating a function that penalizes depth errors with respect to a ground truth, and wherein iteratively reducing the reconstruction error comprises performing at least one of stochastic gradient descent and derivative-free optimization.

11. The system of claim 9, wherein the initial control vectors comprise at least one of pre-existing control vectors, random control vectors, or low-contrast random control vectors.

12. The system of claim 9, wherein updating the set of control vectors also comprises incorporating user-defined constraints comprising at least one of frequency content of the illumination patterns, amplitude of the illumination patterns, and total energy consumption of the illumination patterns.

13. The system of claim 9, wherein the one or more scenes are computationally generated and restricted to lie in a selected subset of 3D space, wherein illuminating the one or more scenes with the illumination pattern comprises a computational simulation, wherein capturing the one or more images comprises computationally simulating image formation, and wherein estimating the gradient of the reconstruction error comprises determining a derivative based on an image formation model.

14. The system of claim 9, wherein the one or more scenes comprise at least one surface, illuminating the one or more scenes with the illumination patterns comprises optical illumination, capturing the one or more images comprises optically capturing the one or more images, and estimating the gradient of the reconstruction error comprises optically estimating an image Jacobian with respect to the control vectors.

\* \* \* \* \*